US012642391B2

(12) United States Patent
Ye et al.

(10) Patent No.: US 12,642,391 B2
(45) Date of Patent: *Jun. 2, 2026

(54) BLENDER

(71) Applicant: LG ELECTRONICS INC., Seoul (KR)

(72) Inventors: Jin-hae Ye, Seoul (KR); Sang-jin Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 892 days.

This patent is subject to a terminal disclaimer.

(21) Appl. No.: 17/727,939

(22) Filed: Apr. 25, 2022

(65) Prior Publication Data

US 2022/0386819 A1     Dec. 8, 2022

(30) Foreign Application Priority Data

Jun. 8, 2021     (KR) ........................ 10-2021-0073880

(51) Int. Cl.
*A47J 43/07*          (2006.01)
*A47J 43/046*          (2006.01)

(52) U.S. Cl.
CPC ......... *A47J 43/0722* (2013.01); *A47J 43/046* (2013.01)

(58) Field of Classification Search
CPC ........................... A47J 43/0716; A47J 43/046
See application file for complete search history.

(56) References Cited

U.S. PATENT DOCUMENTS

2011/0222367 A1*   9/2011   Allen ................... A47J 43/0716
                                                              428/156
2018/0263419 A1*   9/2018   Nernberger .............. H02K 7/14

FOREIGN PATENT DOCUMENTS

| EP | 3264014 A1 | 1/2018 |
| EP | 3735881 A1 | 11/2020 |
| KR | 10-1987055 B1 | 6/2019 |
| KR | 10-2057487 B1 | 12/2019 |

* cited by examiner

*Primary Examiner* — Elizabeth Insler
(74) *Attorney, Agent, or Firm* — Bryan Cave Leighton Paisner LLP

(57) ABSTRACT

Proposed is a blender in which a touch module provided under a touch manipulation part is securely supported. The blender includes a container body in which food is received, a main body provided under the container body and configured to support the container body, and a container lid mounted detachably to an upper surface of the container body and configured to open and close the upper surface of the container body, wherein the main body is provided with the touch module which controls operation of the blender, and the touch module is supported by a supporter.

10 Claims, 15 Drawing Sheets

BLENDER

CROSS REFERENCE TO RELATED APPLICATION

The present application claims priority to Korean Patent Application No. 10-2021-0073880, filed Jun. 8, 2021, the entire contents of which are incorporated herein for all purposes by this reference.

BACKGROUND OF THE INVENTION

Field of the Invention

The present disclosure relates generally to a blender. More particularly, the present disclosure relates to a blender in which a touch module provided under a touch manipulation part is securely supported.

Description of the Related Art

Generally, a blender is referred to as a mixer or crusher, and is mainly used for crushing or chopping food contained in a container body by rotating blades by the rotation of a motor.

In a normal blender, a main body having a motor operated by electricity is located at the lower side of the blender, and the container body receiving food is seated on the upper side of such a main body. Blades crushing or chopping food are provided inside the container body, and are rotated by the rotational force of the motor.

Accordingly, when a user drives the motor by using a manipulation button or a knob of the main body after putting food in the container body, the blades receiving the rotational force generated by the motor crush or chop food contained inside the container body.

Various types of blenders have recently been developed in accordance with a user's desire to facilitate the food intake of office workers due to their busy daily life. That is, a small hand blender has been developed, and a slightly larger blender has been developed that allows food to be crushed in a large capacity or at high speed.

Furthermore, a vacuum blender which cuts or crushes food by vacuumizing the inside of the container body is also disclosed such that a food material received in the container body of the blender can be processed in a fresher state.

However, each of various types of blenders is provided with electronic parts such as a motor assembly and a PCB module for controlling the operation of the blender, and during the operation of the blender, heat is generated in the motor assembly or the PCB module, and malfunction thereof occurs.

In addition, as for a manipulation part composed of a touch button, a PCB provided under the manipulation part is moved, and thus the manipulation sensitivity of the manipulation part is decreased, and manipulation thereof is not accurately performed. That is, in cooking equipment disclosed in Korean Patent No. 10-2057487 or Korean Patent No. 10-198705, a manipulation panel provided under a display part which is manipulated by a user or displays is not securely held, and thus the manipulation of the display part by a user is not accurately transmitted to the manipulation panel or a manipulation error thereof occurs.

DOCUMENTS OF RELATED ART (Patent Document 1) Korean Patent No. 10-2057487
(Patent Document 2) Korean Patent No. 10-1987055

SUMMARY OF THE INVENTION

Accordingly, the present disclosure has been made to solve the above problems occurring in the related art, and the present disclosure is intended to propose a blender in which a touch module provided under a touch manipulation part of a main body is securely fixed.

The present disclosure is intended to propose a blender in which a supporter supporting the touch module provided under the touch manipulation part of the main body is provided.

In addition, the present disclosure is intended to propose a blender in which air introduced into the main body passes through the inside of each of a PCB module and a motor assembly and is discharged to a side under the main body.

In order to achieve the above objectives, according to one aspect of the present disclosure, a blender of the present disclosure may be provided with a supporter supporting a touch module provided under a touch manipulation part of a main body. Accordingly, when the touch manipulation part is manipulated, the movement of the touch module may be prevented.

The blender of the present disclosure may include: a container body in which food is received; the main body provided under the container body and configured to support the container body; and a container lid mounted detachably to the upper surface of the container body and configured to open and close the upper surface of the container body, wherein the main body is provided with the touch module configured to control the operation of the blender, and the touch module may be supported by the supporter.

The touch module may be provided under the touch manipulation part formed on the upper surface of the main body.

The supporter may block the downward movement of the touch module.

The touch module may be held by a PCB holder, and the supporter may be provided on the lower side of the PCB holder.

The supporter may be provided on an end of a heat dissipation frame which fixedly supports a heat dissipation member provided inside the main body.

The supporter may be provided on the upper end of the front end part of the heat dissipation frame.

The supporter may have at least one groove formed therein.

The supporter may include at least one rib.

The blender of the present disclosure may have the following effects.

First, in the blender of the present disclosure, the supporter supporting the touch module may be provided under the touch manipulation part of the main body. Accordingly, during the manipulation of the touch manipulation part, the movement of the touch module may be prevented, thereby improving the precision of touch manipulation and preventing manipulation error.

Second, in the blender of the present disclosure, the touch manipulation part provided on the upper surface of a main body casing of the main body, the touch module provided under the touch manipulation part, and the supporter provided in the heat dissipation frame may be in close contact with each other to be fixed. Accordingly, during touch manipulation by a user, the vertical movement of the touch manipulation part may be prevented, thereby improving touch feeling.

Third, in the blender of the present disclosure, air introduced into the main body may be discharged to a side under the main body. Accordingly, air used for dissipating heat of electronic parts while passing through the inside of the main body may be prevented from coming into direct contact with a user, thereby preventing a user's complaint.

Fourth, in the blender of the present disclosure, a motor housing of a motor assembly provided in the main body may be configured to be covered in side surfaces thereof. That is, all side surfaces may be blocked except for a passage through which wires pass. Accordingly, the flow of air through the side surfaces of the motor housing may be prevented, and the air may flow only vertically inside the motor assembly, thereby increasing coil cooling efficiency inside a motor.

Fifth, in the blender of the present disclosure, a PCB module or the heat dissipation member may be installed in the passage through which the air passes. That is, the PCB module or the heat dissipation member may be installed above an air introduction guide hole into which external air is introduced. Accordingly, due to the cooling of the PCB module or the heat dissipation member, errors such as the malfunction of electronic parts may be prevented.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 5 is a perspective view of the main body constituting the blender of the present disclosure according to the embodiment;

FIG. 15 is a bottom perspective view of the inside of the main body illustrating a state in which an inverter PCB module and a heat dissipation member are removed from the main body of FIG. 14.

DETAILED DESCRIPTION OF THE INVENTION

Hereinafter, a blender of the present disclosure will be described in detail with reference to the accompanying drawings.

Figure 1:
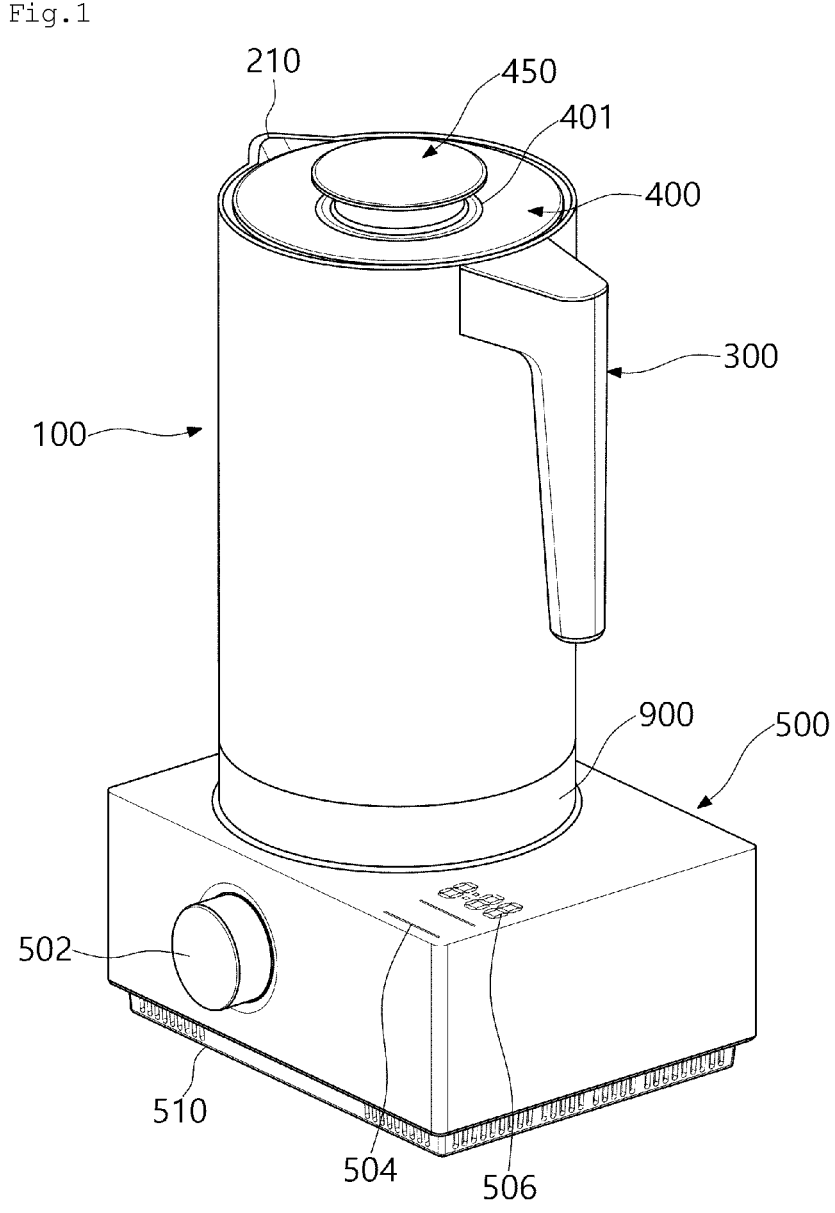
FIG. 1 is a perspective view illustrating the configuration of the blender of the present disclosure according to an exemplary embodiment.
Figure 2:
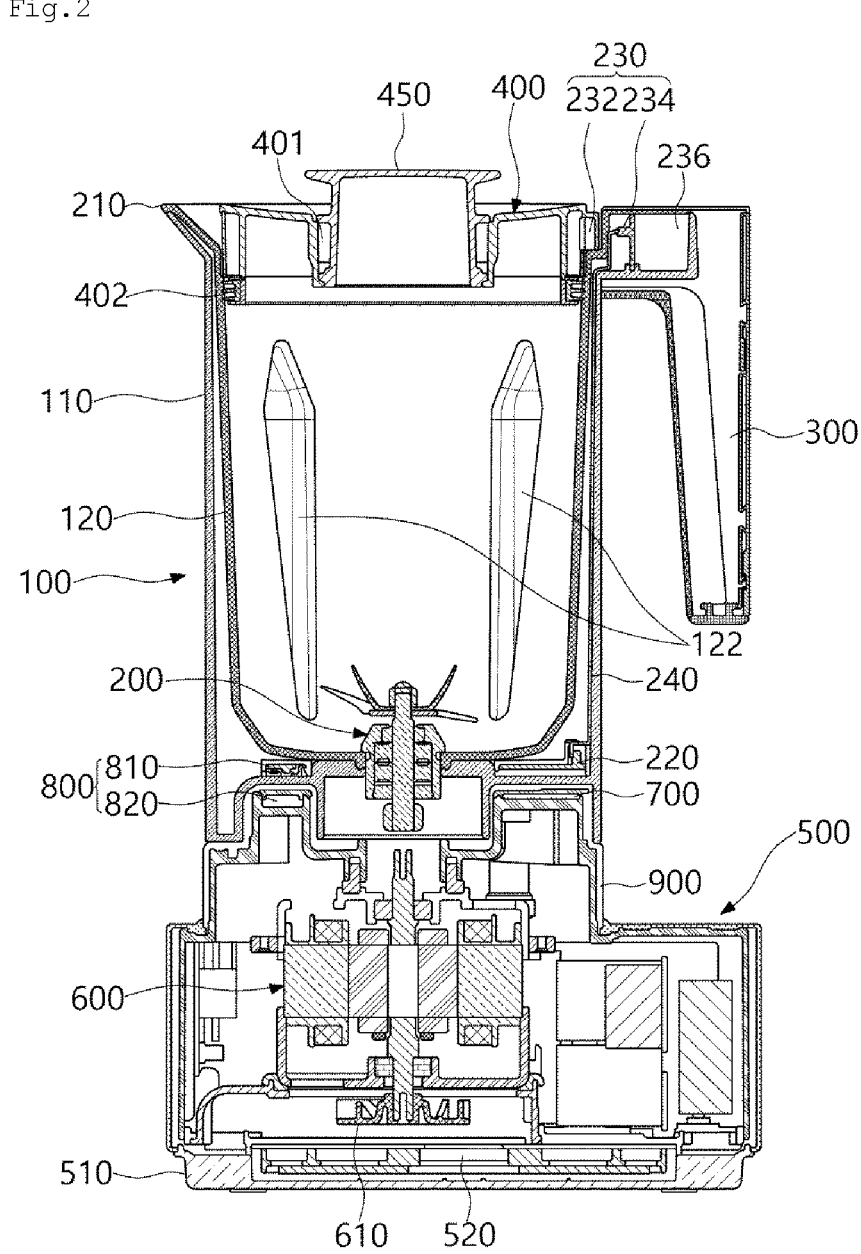
FIG. 2 is a vertical sectional view illustrating the internal configuration of the blender of the present disclosure.

FIGS. 1 and 2 illustrate a perspective view and a vertical sectional view, respectively, showing the configuration of the blender according to an embodiment of the present disclosure.

As illustrated in these drawings, the blender of the present disclosure may include a container body 100 located at an upper side thereof so as to receive food, and a main body 500 provided at the lower side of the container body 100 so as to support the container body 100.

The container body 100 may be a part in which food is received and the process of cutting or crushing the food occurs, and the main body 500 may support the container body 100. Furthermore, multiple parts may be provided inside such a main body 500 to control the cutting or crushing of the food received in the container body 100, or to supply electric power.

The container body 100 may have a cylindrical shape as a whole, and an upper surface thereof may be configured to be open to introduce food thereinto.

The container body 100 may be made of a transparent material such that the inside thereof can be seen from the outside. That is, the container body 100 may be made of glass or transparent plastic such that a user can check the state of food contained inside the container body 100 from the outside.

A blade assembly 200 may be provided in the inner lower part of the container body 100. The blade assembly 200 may have multiple blades (206 of FIG. 3) mounted rotatably thereto such that the blades chop or crush food received in the container body 100.

The blade assembly 200 may be connected to a motor assembly 600 to be described below, and be configured to be rotated by a rotational force generated by the motor assembly 600.

The container body 100 may be configured to have a double structure. That is, the container body 100 may be composed of an outer container body 110 constituting appearance thereof and an inner container body 120 provided inside the outer container body 110. The outer container body 110 and the inner container body 120 may be configured to be in contact with each other or to be spaced apart by a predetermined distance from each other. Furthermore, only a portion of each of the outer container body 110 and the inner container body 120 may be configured to be in contact with each other.

At least one inner guide 122 may be provided in the container body 100 to have a predetermined length in a vertical direction. The inner guides 122 are intended to guide food rotating in the container body 100, and may be configured in pairs symmetrical to each other in the front and rear or left and right of the inner container body 120.

A handle 300 gripped by a user may be formed on the right surface of the container body 100 by protruding therefrom to the right side. Such a handle 300 may be configured such that a user can grip the handle with his or her one hand, and in the present disclosure, the upper end of the handle is illustrated to be connected integrally to the upper surface of the container body 100.

Meanwhile, a spout 210 may be formed at a side opposite to the handle 300.

As illustrated in FIG. 2, the spout 210 may be formed on the upper end of the left surface of the container body 100, and may be a part through which food completely crushed in the container body 100 is guided to be easily poured to the outside. Accordingly, such a spout 210 may be configured to protrude upward more gradually in the left direction.

The upper surface of the container body 100 may be covered by a container lid 400. That is, the container lid 400 may be detachably mounted to the upper surface of the container body 100, and open and close the upper surface of the container body 100.

The container lid 400 may cover the upper surface of container body 100 such that food contained in the container body 100 is not removed to the outside and foreign matter of the outside is not introduced into the container body 100.

The container lid 400 may be configured to be mounted to the container body 100 by pressing or rotating the container lid 400 by a user. A gasket 402 may be provided in the outer circumferential surface of the container lid 400 and block a gap between the container lid 400 and the container body 100. Of course, such a gasket 402 may function to allow the container lid 400 to be pressed and fitted to the container body 100.

A cap 450 may be provided in the container lid 400. That is, a lid hole 401 which is a circular hole having a predetermined size may be famed vertically through the center of the container lid 400, and the cap 450 may be mounted to such a lid hole 401 to cover the lid hole 401.

As illustrated in FIG. 2, the cap 450 may be installed at the center of the container lid 400, and as a whole, may be configured to have a diameter smaller than the diameter of the container lid 400. The cap 450 may be removably mounted to the container lid 400 by forcible fitting by pressing or by rotating.

In the present disclosure, it is illustrated that the cap 450 is configured to be attached to and detached from the container lid 400 by being rotated, and a detailed configuration thereof will be described below.

Since the cap 450 may be removably mounted to the container lid 400, a user may see food contained inside the container body 100 by opening only the cap 450 without opening the container lid 400, and insert food into the container body 100 by opening the cap 450, or insert a mixing rod thereinto and stir the food contained inside the container body 100.

The upper end of the cap 450 may be formed by protruding toward a side upper than the upper end of the container lid 400, so the cap 450 may function as the handle of the container lid 400 gripped by a user when the user opens or closes the container lid 400.

As illustrated in the drawings, the main body 500 may be configured to have a hexahedral shape having the shape of a rectangular barrel as a whole and be provided under the container body 100 so as to support the container body 100, wherein the motor assembly 600 and multiple electronic parts such as a PCB (a printed circuit board) may be mounted inside the main body 500. Of course, the external shape of such a main body 500 may be variously changed as required.

The motor assembly 600 may be provided at the center of the inside of the main body 500. The motor assembly 600 may generate a rotational force by power supplied from the outside such that the blades (206 of FIG. 3) constituting the blade assembly 200 rotate.

Accordingly, the lower end of the blade assembly 200 may be connected to the upper end of the motor assembly 600.

A knob 502 may be provided on the front surface of the main body 500 by protruding forward therefrom. The knob 502 is intended to preset the operation of the blender of the present disclosure, and may be rotatably mounted to the main body 500.

The knob 502 may be configured to control the intensity of the operation of the motor assembly 600. That is, the knob 502 may be configured to change the rotational speed of the motor assembly 600 to high speed or low speed by the clockwise or counterclockwise rotation of the knob 502.

Meanwhile, a touch manipulation part 504 may be provided on the upper surface of the main body 500.

The touch manipulation part 504 is intended to manipulate the blender of the present disclosure by touching, and may be configured to manipulate the starting and stopping of the blender.

Of course, the knob 502 and the touch manipulation part 504 may be configured to selectively preset or manipulate the operation of the blender, or may be configured to overlap each other in the functions of the presetting and manipulating. That is, for convenience, the knob 502 and the touch manipulation part 504 may be configured to have functions overlapping each other such that a user may select any one of the knob 502 and the touch manipulation part 504 to preset or manipulate the operation of the blender.

A display part 506 may be provided at a side of the touch manipulation part 504 (a left side of FIG. 1). That is, the display part 506 may be provided on the upper surface of the main body 500. Such a display part 506 may function to display the state of the operation of the blender such that a user can check the state thereof. Accordingly, such a display part 506 may be configured as a seven-segment display.

A cooling fan 610 may be provided at the lower side of the motor assembly 600.

The cooling fan 610 may be connected to the lower end of the motor assembly 600 and be rotated by a rotating force generated by the motor assembly 600, thereby introducing external air into the main body 500 and forcing the air to be discharged back to the outside. Accordingly, the cooling fan 610 may allow external air to be introduced into the main body 500 and then be discharged to the outside, and thus function to cool parts such as the PCB provided inside the main body 500.

A base end 510 may be provided on the lower surface of the main body 500.

The base end 510 may be formed by protruding downward from the lower surface of the main body 500 and may have a space having a predetermined size therein to receive a wireless power module 520. The wireless power module 520 may function to receive external wireless power in a wireless method using induced electromotive force and to supply the wireless power to the motor assembly 600 provided inside the main body 500.

Meanwhile, a detection system may be provided in the main body 500 and the container body 100 described above so as to detect whether the container lid 400 is mounted to the container body 100.

The detection system may allow an electric circuit (not shown) which can be turned on and off to be formed in the container body 100, and allow such an electric circuit to form a closed circuit, so that the detection system may be configured to detect whether electric current flows in the closed circuit by voltage supplied by the main body 500.

More specifically, the detection system may include: a power transmission means 700 provided in the main body 500 and configured to supply power to the container body 100; a power reception means 220 provided in the container body 100 and configured to receive the power supplied by the power transmission means 700; an on/off means 230 provided at the upper side of the container body 100 and configured to turn on/off the electric circuit formed in the container body 100 depending on whether the container lid 400 is closed; a transparent electrode film 240 made of a transparent material provided on a surface of the container body 100 and connecting the power reception means 220 and the on/off means 230 to each other so as to allow electricity to flow therebetween; and a detection means 800 provided on one side of the main body 500 or the container body 100 and allowing the electric circuit formed by the connection of the power reception means 220 with the on/off means 230 to form a closed circuit so as to detect whether electric current flows.

The power transmission means 700 is intended to transmit power, which is introduced into the main body 500 from the outside of the main body 500 or is prestored in the main body 500, to the container body 100, and may use an induction coil in which induced electromotive force can be generated.

The power reception means 220 is intended to receive the power transmitted from the main body 500, and may be configured to have a structure corresponding to the structure of the power transmission means 700. That is, the power reception means 220 may use a coil such that power is transmitted thereto by induced electromotive force generated between the power transmission means 700 and the power reception means 220.

The power transmission means 700 and the power reception means 220 may be located to be adjacent to each other so as to generate induced electromotive force. Accordingly, in the present disclosure, the power transmission means 700 is mounted to the right upper end of the main body 500, and the power reception means 220 is mounted to the right lower end of the container body 100.

The on/off means 230 may be configured to turn on/off the electric circuit (not shown) formed in the container body 100 depending on whether the container lid 400 is mounted to the container body 100, and may include a permanent magnet 232 and a reed switch 234 provided respectively in the container lid 400 and the container body 100.

As illustrated in FIG. 2, in the present disclosure, the permanent magnet 232 is mounted to the right edge of the container lid 400, and the reed switch 234 is mounted to the right upper end (a portion of the handle) of the container body 100.

More specifically, the reed switch 234 may be installed to be received in a reed switch groove 236 formed in the upper end portion of the handle 300.

It is widely known that the reed switch has magnetic movable contacts enclosed in a glass tube, and when a magnet approaches the reed switch, the contacts in the glass tube contact with each other. Here, the further detailed description of the configuration and principle of the reed switch will be omitted.

Of course, except for the use of the permanent magnet 232 and the reed switch 234 as such an on/off means 230, other electric on/off means or mechanical structures may be used to turn on/off the electric circuit, and the installation positions of the permanent magnet 232 and the reed switch 234 mounted respectively to the container lid 400 and the container body 100 may be reversed.

Various types of electrical devices or structures having a function that can detect whether electric current flows in the electric circuit formed in the container body 100 turned on/off by the on/off means 230 may be used as the detection means 800. However, in the present disclosure, a photosensor is used to detect light as an example.

Accordingly, the detection means 800 may include a light transmission module 810 provided in the container body 100 to generate light, and a light reception module 820 provided in the main body 500 to receive the light transmitted by the light transmission module 810.

The light transmission module 810 and the light reception module 820 may be located at positions adjacent to each other. In the present disclosure, as illustrated in FIG. 2, the light transmission module 810 may be located on the left lower end of the container body 100, and the light reception module 820 may be located on the left upper end of the main body 500.

The light transmission module 810 may use an LED that emits light by electricity, and the light reception module 820 may use the photosensor that receives light and converts the light into an electrical signal.

Furthermore, the transparent electrode film 240 may be provided between the outer container body 110 and the inner container body 120. More specifically, the transparent electrode film 240 may be attached to the inner surface of the outer container body 110.

The transparent electrode film 240 may be made of a transparent material such as an ITO film (an indium-tin oxide film) and may be attached to the surface of the container body 100, and may allow the on/off means 230 provided on the upper side of the container body 100 to be connected to the power reception means 220 and the light transmission module 810 provided on the lower end portion of the container body 100 so as to form an electric circuit.

Accordingly, the transparent electrode film 240 may be attached vertically and longitudinally to the surface of the container body 100 made of a transparent material and may function to guide the transmission of an electrical signal between the upper and lower ends of the container body 100.

Accordingly, when the container body 100 is made of a transparent material, and the transparent electrode film 240 is also made of a transparent material, the transparent electrode film 240 may not be visually exposed, so the appearance of the container body 100 may not be damaged to maintain the design thereof.

In addition, when the transparent electrode film 240 is attached to the surface of the container body 100, the transparent electrode film 240 may have a hole formed therein to remove air bubbles that may be generated between attached surfaces. That is, a perforated hole may be added to the center of the transparent electrode film 240 made of the ITO film to allow the air bubbles to escape therethrough such that the generation of the air bubbles is prevented.

Meanwhile, a seating step 900 may be foiled on the upper surface of the main body 500 by protruding upward therefrom.

The seating step 900 may be configured to have a circular shape corresponding to the shape of the lower end of the container body 100, so that the lower end of the container body 100 may be mounted to the seating step 900 to be vertically removed therefrom.

Furthermore, the container body 100 may be configured as a double structure. That is, the container body 100 may be composed of the outer container body 110 and the inner container body 120, and the inner guides 122 may be formed on the inner surface of the inner container body 120 by protruding inward therefrom.

Hereinafter, the configuration of the container body 100 will be described in detail.

Figure 3:
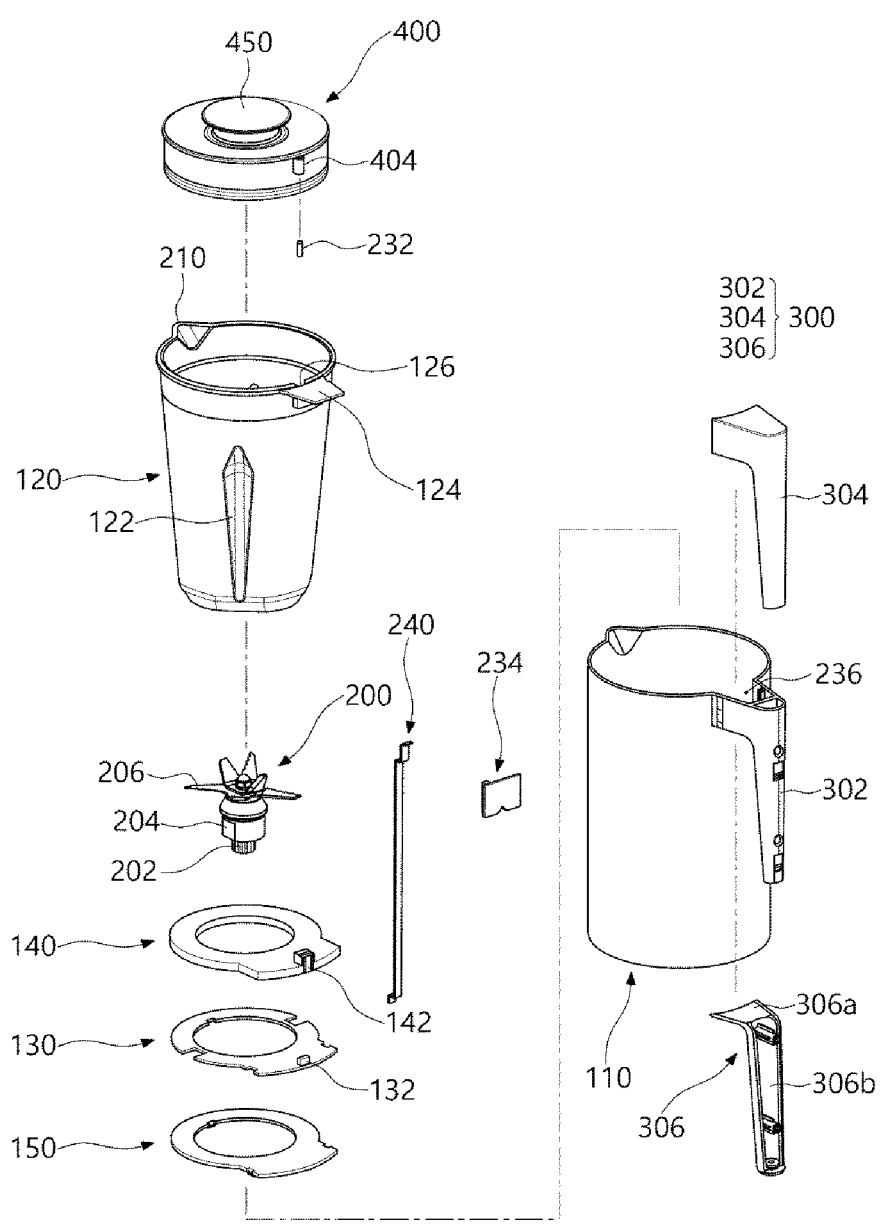
FIG. 3 is an exploded perspective view illustrating the detailed configuration of a container body constituting the blender of the present disclosure according to the embodiment.
Figure 4:
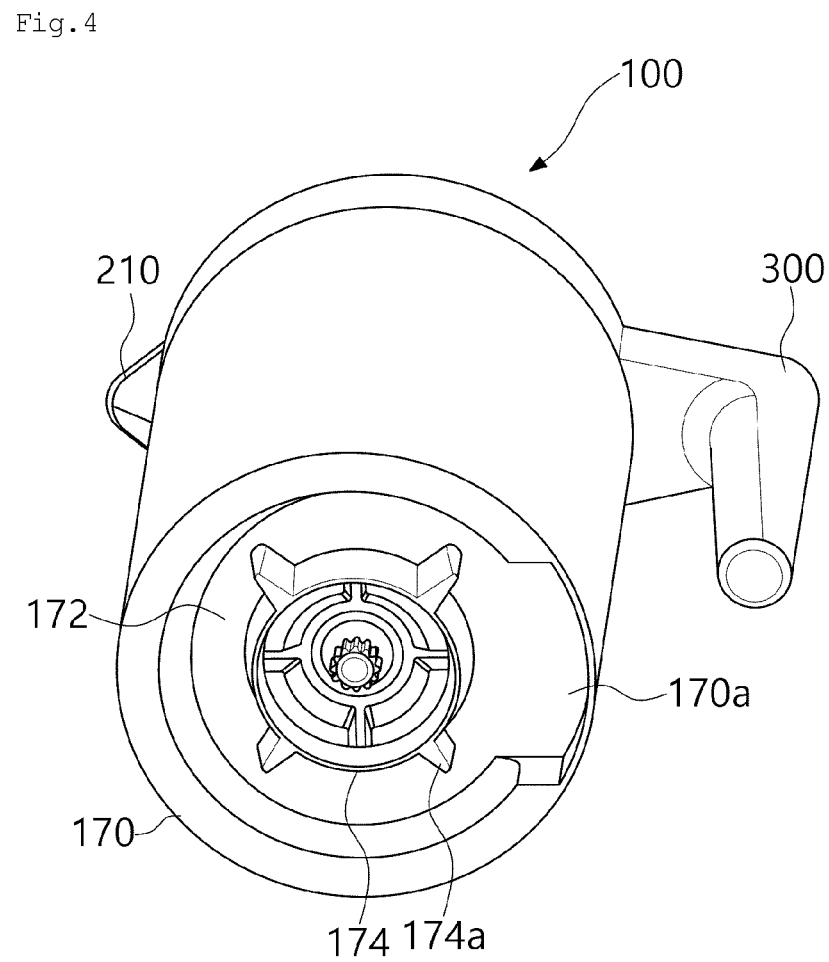
FIG. 4 is a bottom perspective view of the container body constituting the blender of the present disclosure according to the embodiment.

FIG. 3 illustrates an exploded perspective view of the container body 100, and FIG. 4 illustrates a bottom perspective view of the container body 100.

As illustrated in these drawings, the container body 100 may be configured as a double structure having a cylindrical shape as a whole. That is, the container body 100 may include the outer container body 110 constituting an appearance thereof, and the inner container body 120 provided inside the outer container body 110.

The container body 100, that is, each of the outer container body 110 and the inner container body 120 may be made of a transparent material. That is, the container body 100 may be made of a transparent material such as glass, Tritan, or transparent plastic such that a user can check the state of food contained inside the container body 100 from the outside.

The outer container body 110 may constitute the appearance of the container body, and be configured to have a cylindrical shape with the same top and bottom sizes, and a main handle 302 may be famed on the outer right surface of the outer container body 110 by protruding therefrom to the right such that a user can grip the main handle.

The main handle 302 may be formed to have an L shape, and an upper end portion thereof may be connected to the right upper end of the outer container body 110. The main handle 302 may be formed integrally with the outer container body 110 by injection molding. Accordingly, the main handle 302 formed integrally with the outer container body 110 may have improved strength and durability compared to a main handle formed as a part separate from the outer container body 110 to be fixed thereto.

The reed switch groove 236 receiving the reed switch 234 may be formed at a portion at which the main handle 302 is connected to the container body 100. That is, the reed switch groove 236 may be formed in the upper end of the main handle 302, and may provide space to mount the reed switch 234 therein, and the left of such a reed switch groove 236 may be open.

An outer handle 304 and an inner handle 306 may be provided respectively on the outer and inner sides of the main handle 302. That is, as illustrated in FIG. 3, the outer handle 304 may be provided at the right of the main handle 302, and the inner handle 306 may be provided at the left of the main handle 302.

More specifically, the outer handle 304 may also be configured to have an L shape as a whole as does the main handle 302, and to cover the upper surface, right surface, and front and rear surfaces of the main handle 302. The outer handle 304 may be made of a material such as stainless steel that has a smooth surface and is resistant to rust, and may not break easily and look beautiful to a user.

The inner handle 306 may cover the left surface and lower surface of the main handle 302, and may be configured to have an L shape corresponding to the shape of the left and lower surfaces of the main handle 302, and at least a portion of the inner handle may be made of an elastic material.

Specifically, the inner handle 306 may include a connection part 306a covering the lower part of the upper end of the main handle 302, and a gripping part 306b extending downward from the connection part 306a and covering the left surface of the main handle 302.

Like the outer handle 304, the connection part 306a may be made of a smooth and strong material, and the gripping part 306b may be a part covered by a user's fingers, and be made of an elastic material. That is, the connection part 306a may be made of stainless steel, and the gripping part 306b may be made of an elastic material such as rubber that can give a user a soft touch since the four fingers (except for the thumb) of the user cover the gripping part.

The inner container body 120 may be configured to have size (a diameter) smaller than the size (a diameter) of the outer container body 110 and may be seated inside the outer container body 110.

The inner container body 120 may be configured to have a cylindrical shape having an open upper part. More specifically, as illustrated in FIG. 3, the inner container body 120 may be configured to have a tapered shape having a diameter gradually decreasing toward the lower side thereof.

Furthermore, as described above, the multiple inner guides 122 may be vertically formed on the inner surface of such an inner container body 120, and the blade assembly 200 may be mounted to the lower end of the inner container body 120.

The spout 210 may be formed on the left upper end of the inner container body 120 by protruding therefrom to the left, and a covering end 124 may be formed on the right upper end of the inner container body 120 by extending therefrom to the right.

The covering end 124 may cover the upper surface of the reed switch groove 236 of the outer container body 110. The covering end 124 may be configured as a flat plate having a predetermined thickness and to have width gradually decreasing toward the right to correspond to the size of the upper end of the reed switch groove 236.

The blade assembly 200 may be mounted to the lower end of the inner container body 120.

The blade assembly 200 may allow food to be finely crushed or mixed by the blades, and may include: a blade shaft 202 rotated by receiving rotational power from the motor assembly 600; a blade body 204 provided at the outer side of the blade shaft 202 and supporting the blade shaft 202; and at least one blade 206 rotated by being connected to the blade shaft 202 so as to crush food.

A magnet holder 404 may be provided on the outer circumferential surface of the container lid 400. That is, as illustrated in FIG. 3, the magnet holder 404 may be formed on the outer circumferential surface of the container lid 400 by protruding therefrom to the outside, wherein the permanent magnet 232 may be mounted in the magnet holder 404.

The permanent magnet 232 may be intended to control the turning on/off of the reed switch 234 when the container lid 400 is mounted to or removed from the container body 100.

A coil holder assembly may be provided between the outer container body 110 and the inner container body 120.

The coil holder assembly may include a coil holder 130 having an induction coil, and an upper cover 140 and a lower cover 150 covering the upper and lower sides of the coil holder 130, respectively.

Specifically, the coil holder 130 may be provided between the bottom surface of the outer container body 110 and the lower surface of the inner container body 120, and the power reception means 220 and the light transmission module 810 may be mounted to such a coil holder 130.

The entirety of the coil holder 130 may have the shape of a circular ring having a predetermined thickness, and the power reception means 220 may be provided at the right end of the coil holder 130 having such a ring shape. That is, although not shown in detail, an induction coil which receives power may be provided at the right end of the coil holder 130, and constitute the power reception means 220.

The power reception means 220 mounted to the coil holder 130 may be embodied with a reception induction coil patterned on the same plane as the PCB. That is, in the power reception means 220 according to the embodiment of the present disclosure, the reception induction coil provided on the lower surface of the coil holder 130 may be configured to be wound multiple times on the PCB in a spiral shape relative to a reception center point.

In addition, the light transmission module 810 may be provided on the lower surface of the coil holder 130.

The light transmission module 810 may emit light by power supplied from the power reception means 220. The light transmission module 810 may be configured as a part of the detection means 800, and use the LED emitting light as described above.

The power reception means 220 and the light transmission module 810 may be electrically connected to each other. That is, the power reception means 220 and the light transmission module 810 may be configured to form a closed circuit in cooperation with the on/off means 230. Accordingly, the power reception means 220 and the light transmission module 810 provided in the coil holder 130, and the on/off means 230 may be configured to be electrically connected to each other by the PCB.

Furthermore, although not shown, the coil holder 130 may further include a conversion module that converts an alternating current (AC) to a direct current (DC).

A holder terminal 132 may be provided on the upper surface of the right end of the coil holder 130.

The holder terminal 132 may be a part to which the lower end of the transparent electrode film 240 is inserted and connected.

As illustrated in FIG. 3, the coil holder 130 may be configured to have an approximate ring shape as a whole, and the right end of the coil holder 130 may be configured to have a relatively large width such that the power reception means 220 can be mounted thereto.

Multiple grooves may be formed in the outer and inner circumferential surfaces of the coil holder 130 such that hooks for fixing multiple parts pass through the multiple grooves.

The coil holder 130 may be protected by the upper and lower covers 140 and 150. That is, the upper cover 140 and the lower cover 150 may be provided on the upper surface and lower surface of the coil holder 130, respectively, so as to cover the upper surface and lower surface thereof, the upper cover and lower cover having shapes corresponding to the upper surface and lower surface of the coil holder 130, respectively.

A terminal holder 142 may be famed on the right end of the upper cover 140 by protruding upward therefrom to receive the holder terminal 132 of the coil holder 130 therein. Accordingly, the holder terminal 132 may be received in the terminal holder 142 by being introduced thereto from the lower side of the terminal holder 142, and the upper part of such a terminal holder 142 may be configured to be partially open such that the lower end of the transparent electrode film 240 passes therethrough.

A hook may be formed on the upper cover 140 such that the upper cover 140 is coupled to the lower cover 150.

As described above, the transparent electrode film 240 may be made of a transparent material such as the ITO film, and may be configured to have length corresponding to the vertical length of the container body 100.

The transparent electrode film 240 may be provided between the outer container body 110 and the inner container body 120. Accordingly, when the transparent electrode film 240 is provided between the outer container body 110 and the inner container body 120, the transparent electrode film 240 may be prevented from being in contact with food contained in the inner container body 120, and may be prevented from being in contact with foreign matter outside of the outer container body 110.

The transparent electrode film 240 may be attached to the surface of the outer container body 110, or the surface of the inner container body 120. That is, the transparent electrode film 240 may be attached to the inner surface of the outer container body 110 or the outer surface (an outer circumferential surface) of the inner container body 120.

Here, the transparent electrode film 240 attached vertically to the inner surface of the outer container body 110 will be described as an example.

As is illustrated in FIG. 3, each of the upper and lower ends of the transparent electrode film 240 may be bent at least one time. The lower end of the transparent electrode film 240 may pass through the terminal holder 142 of the upper cover 140 and be connected to the holder terminal 132 of the coil holder 130, and the upper end of the transparent electrode film 240 may be connected to the reed switch 234.

A film guide 160 to which the transparent electrode film 240 is attached may be formed vertically on the inner surface of the outer container body 110. That is, the film guide 160 may be formed vertically and longitudinally on the right inner surface of the outer container body 110 and may guide the attachment of the transparent electrode film 240.

A magnet groove 126 may be formed in the upper end of the inner container body 120 by being recessed therefrom to the outside such that the permanent magnet 232 is received in the magnet groove 126. That is, the upper end of the right surface of the inner container body 120 may be bent to be stepped to the right so as to form the magnet groove 126, and such a magnet groove 126 may be a part in which the permanent magnet 232 is located.

Meanwhile, the lower surface of the container body 100 may be configured to have a shape corresponding to the shape of the upper surface of the main body 500 such that the container body 100 is easily attached to and detached from the upper surface of the main body 500.

More specifically, the container body 100 may be mounted to the seating step 900 of the main body 500 to be described below.

Accordingly, the lower surface of the container body 100 may be configured to have a shape corresponding to the shape of the upper end of the main body 500, so the container body 100 may be stably mounted to and easily removed from the main body 500.

A container body end 170 having a predetermined width may be formed on the lower surface of the container body 100 by protruding downward therefrom. The container body end 170 may be a part which is in contact with the upper surface of a lower step 910 of the main body 500 to be described below, and may be configured to have a shape corresponding to the upper surface of the lower step 910.

An upper step receiving groove 172 may be formed in the center of the lower surface of the container body 100 by being recessed upward therefrom. That is, the upper step receiving groove 172 may be formed by being recessed upward at the inner side of the container body end 170 of the container body 100. When the container body 100 is mounted to the main body 500, an upper step 920 of the main body 500 to be described below may be received in such an upper step receiving groove 172.

The container body end 170 may have the shape of a circular ring having a partially open part, and the open part may be a part in which a coil seating part 940 to be described below is received. That is, the right end of the container body end 170 may be open to form a coil seating part groove 170a. The coil seating part 940 to be described below may be received in such a coil seating part groove 170a.

A circular end 174 may be famed on the center of the lower surface of the container body 100 by protruding downward therefrom. That is, the circular end 174 protruding downward may be provided in the center of the upper step receiving groove 172.

As illustrated in FIG. 4, the circular end 174 may have the shape of a circular ring and be hollow therein, and may provide a passage connecting the blade assembly 200 to the motor assembly 600.

The circular end 174 may be a part received in a circular end receiving groove 980 formed in the main body 500 to be described below.

Multiple mounting protrusions 174a may be formed on the outer circumferential surface of the circular end 174 by protruding radially therefrom. Each of the mounting protrusions 174a may function to tightly mount the container body 100 to the corresponding position of the main body 500 such that the container body 100 is held without being rotated. The mounting protrusion 174a may include at least one mounting protrusion.

In the present disclosure, the mounting protrusion 174a is illustrated to have four mounting protrusions 174a. As illustrated in FIG. 4, such a mounting protrusion 174a may be formed to have thickness gradually decreasing toward the outside. This is intended to easily receive the mounting protrusions 174a in protrusion grooves 982 to be described below.

Figure 5:
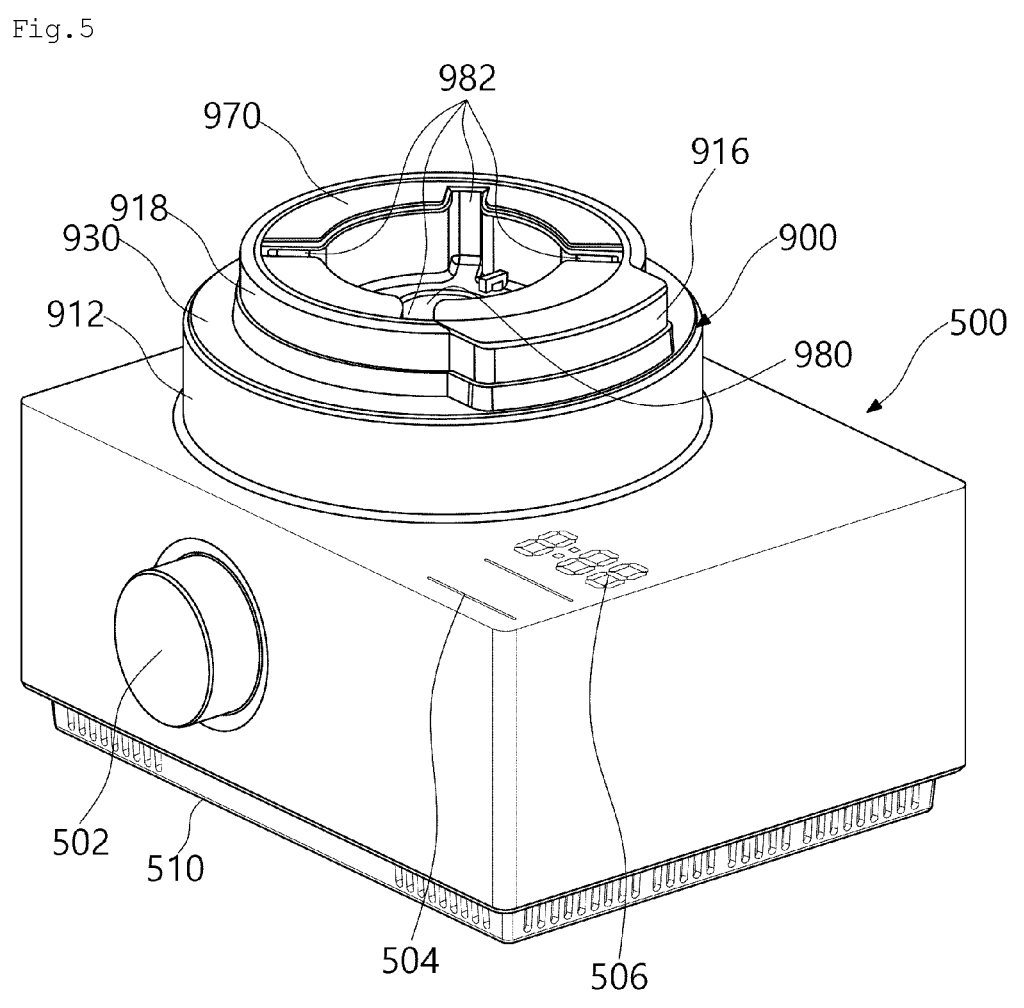
Figure 6:
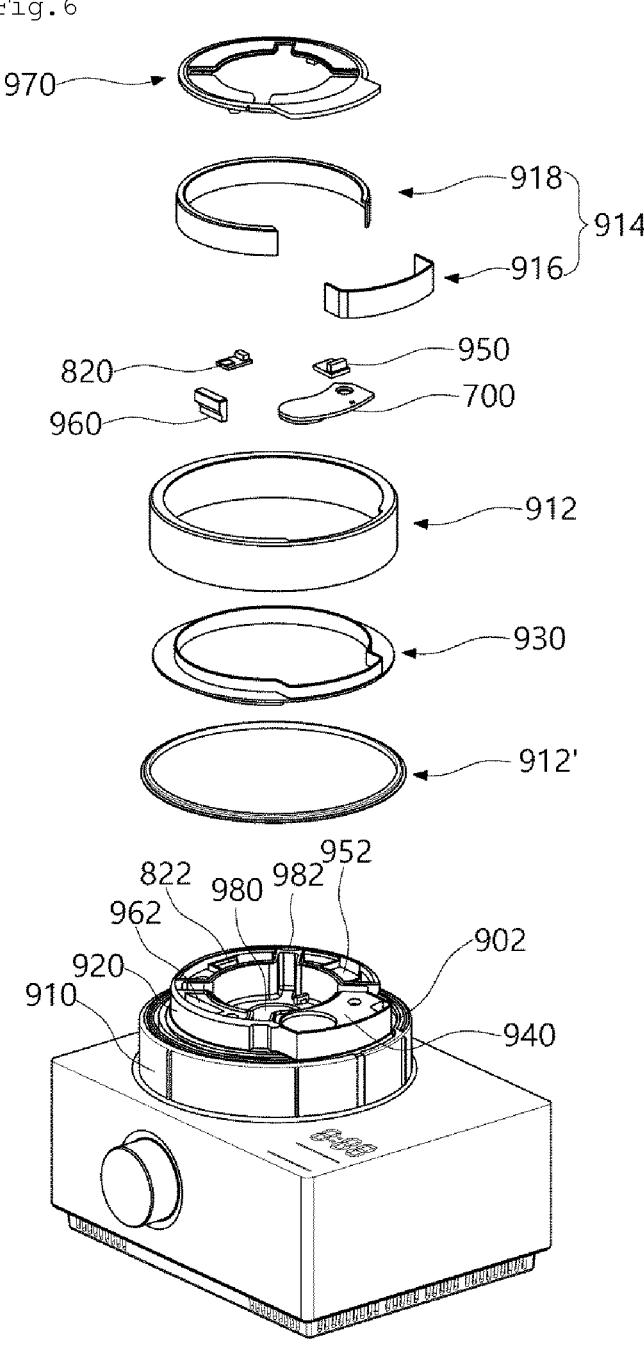
FIG. 6 is an exploded perspective view illustrating the configuration of the upper half part of the main body constituting the blender of the present disclosure according to the embodiment.
Figure 7:
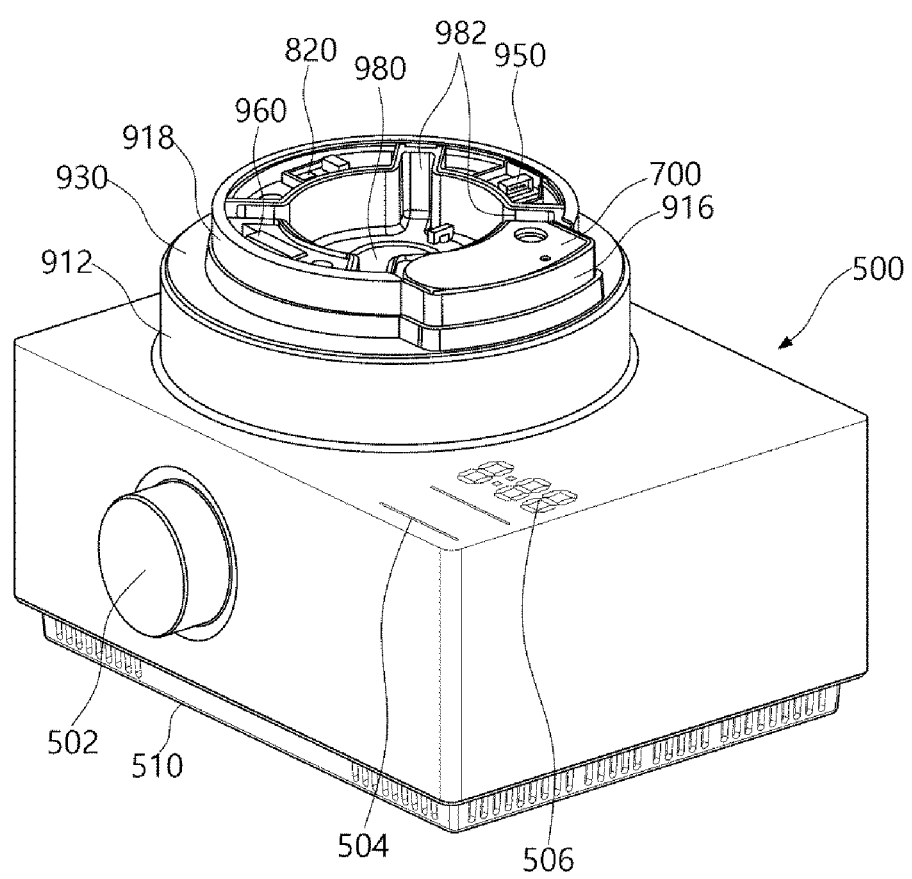
FIG. 7 is a perspective view illustrating a state in which a cover is removed from the main body constituting the blender of the present disclosure according to the embodiment.

In FIGS. 5 to 7, the configuration of the upper half part of the main body 500 is illustrated in detail. That is, FIG. 5 illustrates a perspective view of the main body 500; FIG. 6 illustrates an exploded perspective view illustrating the configuration of the upper half part of the main body 500; and FIG. 7 illustrates a perspective view of the configuration of the main body 500 from which the cover is removed.

As illustrated in these drawings, the seating step 900 may be provided on the upper surface of the main body 500 by protruding therefrom to be stepped upward such that the lower surface of the container body 100 is seated thereon.

The seating step 900 may be a part by which the lower end of the container body 100 is seated and be supported. Accordingly, such a seating step 900 may be configured to have a shape corresponding to the shape of the lower part of the container body 100.

Specifically, the seating step 900 may be famed by being stepped, and may include the lower step 910 having a diameter corresponding to the diameter of the lower end of the container body 100, and the upper step 920 formed by protruding upward from the lower step 910 and having a diameter smaller than the diameter of the lower step 910.

As illustrated in FIG. 6, the lower step 910 may be configured to have a circular shape and a predetermined height, and the upper step 920 having a diameter smaller than the diameter of the lower step 910 may be formed on the upper part of such a lower step 910 by protruding upward therefrom to have a predetermined height. Accordingly, a step surface 902 horizontal like the upper surface of the main body 500 may be formed between the lower step 910 having the larger diameter and the upper step 920 having the smaller diameter.

A lower step ring 912 and an upper step ring 914 having shapes corresponding to the outer surfaces of the lower step 910 and the upper step 920, respectively, may be provided on the outer surfaces of the lower step 910 and the upper step 920, respectively. That is, the lower step ring 912 and the upper step ring 914 may be provided on the outer circumferential surfaces of the lower step 910 and the upper step 920, respectively, which have the outer surfaces of circular shapes, and may respectively cover the outer surfaces (side surfaces) of the lower step 910 and the upper step 920.

The lower step ring 912 and the upper step ring 914 may be made of metal and may protect parts thereinside, and may function as exterior materials. Accordingly, like the outer handle 304, the lower step ring 912 and the upper step ring 914 may be made of a material such as stainless steel which has a smooth surface and is resistant to rust.

In addition, an elastic member 930 made of an elastic material may be provided on the step surface 902 provided between the upper step 920 and the lower step 910. As illustrated in FIG. 5, the elastic member 930 may be configured to cover the step surface 902 formed on the upper surface of the lower step 910, and to cover the lower half part of the upper step 920.

The elastic member 930 may be made of an elastic material, and thus may function to buffer impact which may be generated when the container body 100 sits on the main body 500. That is, when the lower surface of the container body 100 sitting on the upper step 920 is in contact with the upper step 920, the elastic member 930 may function to prevent breakage or noise that may occur due to the collision of the lower surface of the container body 100 with the upper step 920 and the lower step 910 of the main body 500, which are made of solid materials.

Accordingly, the elastic member 930 may be made of a material such as rubber, and may function to make the seating of the container body 100 efficient. Further, the elastic member 930 may be made of a conductive rubber when required, and in this case, a conductive rubber may be provided even on the lower surface of the container body 100.

The power transmission means 700 and the light reception module 820 may be mounted to the upper surface of the upper step 920.

Specifically, the coil seating part 940 may be formed on the right surface of the upper step 920 by protruding therefrom to the right, and the power transmission means 700 may be mounted to the upper surface of such a coil seating part 940.

The power transmission means 700 may be located to be adjacent to the power reception means 220 provided in the container body 100, and may function to supply power to the power reception means 220. Accordingly, such a power transmission means 700 may be configured as an induction coil. That is, like the power reception means 220, the induction coil may be configured by being wound multiple times on the same plane, such as a PCB, in a spiral shape relative to a transmission center point (not shown).

In addition, although now shown in detail, the main body 500 may have an oscillation circuit part therein. Such an oscillation circuit part may generate current and apply the current to the power transmission means 700. Accordingly, a magnetic field may be famed in the power transmission means 700 by the applied current. Furthermore, the oscillation circuit part may change the intensity of the current applied to the power transmission means 700, and thus the magnetic field may be changed in the power transmission means 700 by the change of the current intensity.

Accordingly, as in the present disclosure, with the power reception means 220 and the power transmission means 700 installed to vertically correspond to each other, as the intensity of current applied to the power transmission means 700 changes, the magnetic field of the power transmission means 700 may be changed, and a magnetic flux passing through the power reception means 220 may be changed due to inductive coupling between the power transmission means 700 and the power reception means 220, so the induced electromotive force may be generated in the power reception means 220. Furthermore, such an induced electromotive force may be supplied to the light transmission module 810.

The light reception module 820 may be provided at a side opposite to the power transmission means 700. That is, the light reception module 820 may be mounted in a receiving groove 822 formed in the left end of the upper surface of the upper step 920, which is a position vertically corresponding to the light transmission module 810 mounted to the container body 100.

Specifically, the receiving groove 822 having a predetermined size may be famed in the left end of the upper surface of the upper step 920 by being depressed therefrom, and the light reception module 820 may be mounted in such a receiving groove 822.

As described above, the light reception module 820 may include the photosensor. The light reception module 820 may receive light transmitted by the light transmission module 810, and transmit a light reception signal.

In addition, a Hall sensor 950 and a container body detection switch 960 may be provided on the upper surface of the upper step 920. That is, a container body switch groove 962 and a sensor groove 952 may be formed respectively in the front end portion and rear end portion of the upper surface of the upper step 920 by being depressed therefrom, and the container body detection switch 960 and the Hall sensor 950 may be mounted in the container body switch groove 962 and the sensor groove 952, respectively.

The container body detection switch 960 may be configured as a reed switch, and may detect whether the container body 100 is seated on the upper surface of the main body 500. When such a container body detection switch 960 is provided, a magnet (not shown) corresponding thereto may be provided on the lower end of the container body 100.

The Hall sensor 950 is intended to determine the type of the container body 100 seated on the main body 500, and even in this case, a signal transmission means corresponding thereto may be required on the lower surface of the container body 100.

The upper step ring 914 mounted to the edge of the upper step 920 may be configured to be divided into two parts. That is, as illustrated in FIG. 6, the upper step ring 914 may include a protruding piece 916 covering the outer surface of the coil seating part 940 formed on the right surface of the upper step 920 by protruding therefrom to the right, and a curved piece 918 covering the remaining outer surface of the upper step 920. As described above, the protruding piece 916 and the curved piece 918 are preferably made of metal such as stainless steel.

Meanwhile, the upper part of the upper step 920 may be covered by a cover 970. Accordingly, the power transmission means 700, the light reception means 820, the container body detection switch 960, and the Hall sensor 950 mounted to the upper step 920 may be covered and protected by the cover 970.

In addition, the seating step 900 may have a center part vertically formed therethrough such that the blade assembly 200 of the container body 100 and the motor assembly 600 provided in the main body 500 may be connected to each other.

More particularly, the circular end receiving groove 980 may be formed in the center portion of the upper step 920 by being depressed therefrom, and the circular end 174 of the lower end of the container body 100 described above may be received in such a circular end receiving groove 980. That is, the upper step 920 may have the shape of a circular ring as a whole, and the circular end receiving groove 980 having a circular shape may be formed in the center portion of such an upper step 920.

At least one protrusion groove 982 may be formed in the inner surface of the upper step 920. The protrusion groove 982 may be formed by being repressed radially from the circular end receiving groove 980, and the mounting protrusions 174a of the container body 100 may be seated in the protrusion grooves 982.

Accordingly, the protrusion grooves 982 may be configured to have the size and number thereof corresponding to the size and number of the mounting protrusions 174a, and the size of the width of the protrusion groove 982 may be configured to be the same as or larger than the size of the width of the mounting protrusion 174a.

A cover ring 912' may be provided on the lower end part of the lower step 910. That is, the cover ring 912' may be provided on the coupling portion of the lower step ring 912 with the upper surface of the main body 500. The cover ring 912' may be made of a material having elasticity, and may be configured to have a circular ring shape as illustrated in the drawings. Accordingly, the covering 912' may cover a gap between the lower step ring 912 and the upper surface of the main body 500 or may facilitate the coupling of the lower step ring 912 therewith.

Figure 8:
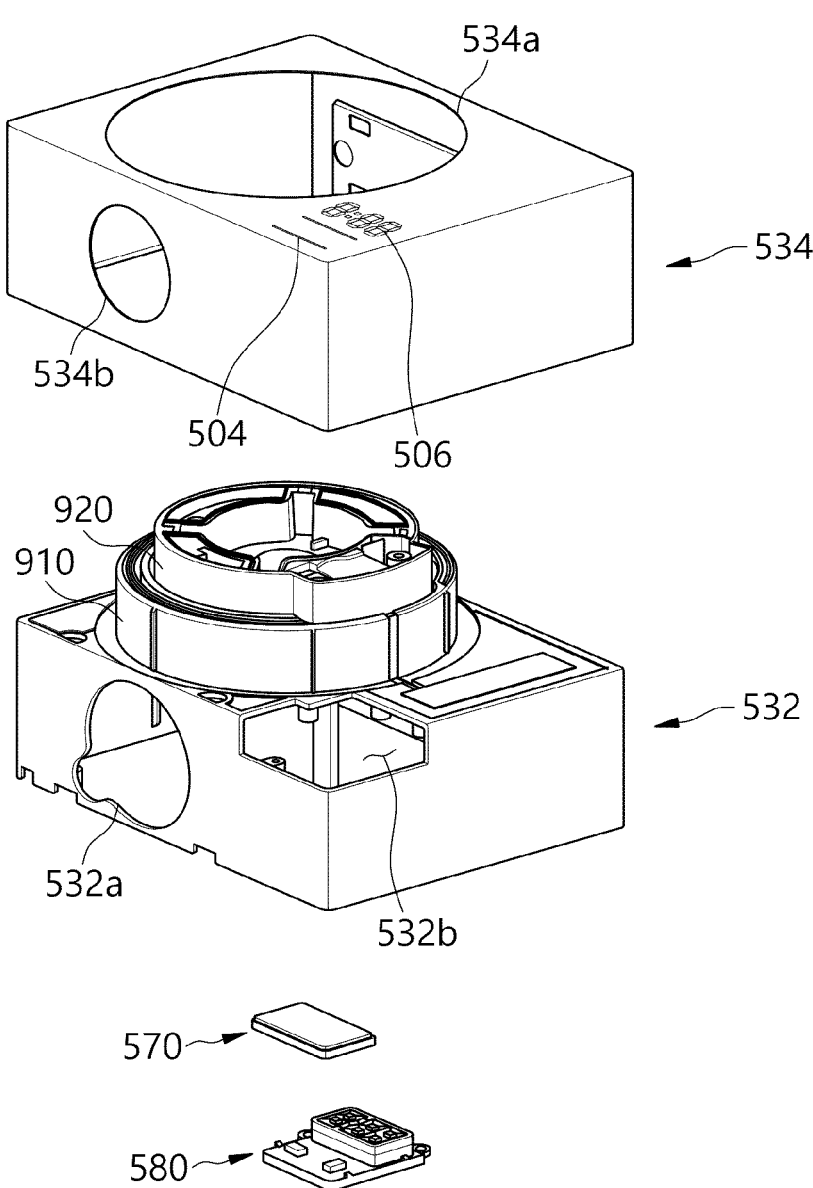
FIG. 8 is an exploded perspective view illustrating the configuration of a main body casing constituting the blender according to the embodiment of the present disclosure.

FIG. 8 illustrates the exploded perspective view of the configuration of a main body casing constituting the main body 500. The main body 500 may be formed in a hexahedral shape as a whole, and an approximate exterior thereof may be constituted by the main body casing 530.

As illustrated in FIG. 8, the main body casing 530 may be configured as a rectangular box-shaped hexahedron having an open lower part, and the lower side of the main body casing 530 may be covered by a base plate 540 to be described below and the base end 510 described above.

The main body casing 530 is preferably configured as a double structure. That is, the main body casing 530 may be composed of an inner casing 532 and an outer casing 534 provided respectively at inner and outer sides thereof, wherein the outer casing 534 is preferably made of a metal material or a material having a metal texture.

The seating step 900 may constitute a portion of the upper exterior of the main body casing 530. That is, the seating step 900 may be famed on the center portion of the upper surface of the main body casing 530, and thus such a seating step 900 may be constitute a portion of the upper surface of the main body 500.

Specifically, the seating step 900 including the lower step 910 and the upper step 920 may be famed on the upper surface of the inner casing 532 by protruding upward therefrom. Such a seating step 900 may be formed to be integrated with the inner casing 532 or may be formed separately from the inner casing 532 to be coupled thereto.

As illustrated in FIG. 8, each of the inner casing 532 and the outer casing 534 may be configured to have an open lower part, and the outer casing 534 may be configured to have size larger than the size of the inner casing 532. Accordingly, the inner casing 532 is preferably configured such that the inner casing 532 can be inserted into the outer casing 534 from the lower side thereof.

A casing hole 534a may be formed vertically through the upper surface of the outer casing 534 such that the seating step 900 of the inner casing 532 can be inserted into the casing hole 534a, and an outer knob hole 534b may be formed through the front surface of the outer casing 534 in a front-to-rear direction such that the knob 502 can be inserted into the outer knob hole 534b.

A hole through which the knob 502 passes may be famed even in the inner casing 532. That is, an inner knob hole 532a through which the knob 502 passes may be formed through the front surface of the inner casing 532 in the front-to-rear direction.

A module seating part 532b may be formed in the inner casing 532. That is, as illustrated in FIG. 8, the module seating part 532b may be famed by partially cutting the corner of the right front portion of the upper surface of the inner casing 532. A touch module 570 and a display module 580 are preferably located in such a module seating part 532b.

When the touch module 570 and the display module 580 are installed in the module seating part 532b, the touch module 570 and the display module 580 may be located under the touch manipulation part 504 and the display part 506 of the outer casing 534. Additionally, the touch module 570 provided in the module seating part 532b of the inner casing 532 and the touch manipulation part 504 of the outer casing 534 may be installed to be vertically in close contact with each other, and accordingly, the touch module 570 may detect the touch or press of the touch manipulation part 504.

The touch module 570 may have a function to detect the touch or press of the touch manipulation part 504 by a user, and the display module 580 may allow the operation state or temperature of the blender to be displayed to the outside through the display part 506.

The installation states of the touch module 570 and the display module 580 will be described in detail below.

Figure 9:
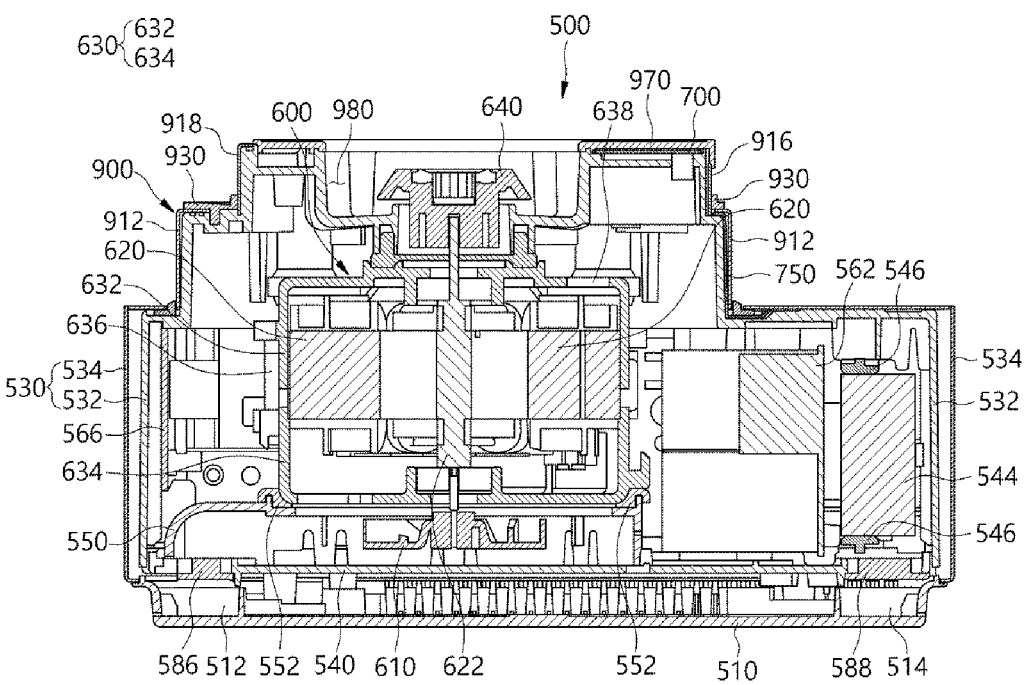
FIG. 9 is a front sectional view illustrating the internal configuration of the main body constituting the blender according to the embodiment of the present disclosure.

FIG. 9 illustrates a sectional view showing the internal configuration of the main body 500.

Referring to the drawing, as described above, the main body 500 may be formed in a hexahedral shape as a whole, and the main body casing 530 may be configured as a double structure. The exterior of the main body 500 may be constituted by the outer casing 534.

As described above, the inner casing 532 may be provided inside the outer casing 534 and may substantially support multiple parts provided therein. Accordingly, space in which the motor assembly 600 described above and a PCB module are mounted may be defined inside the inner casing 532.

The motor assembly 600 may be installed on the center portion of the main body 500 and may include a motor 620 having a motor shaft 622 provided by passing vertically through a center part thereof, and a motor housing 630 constituting the exterior of the motor 620.

The motor housing 630 may include an upper housing 632 which covers the upper half part of the motor 620, and a lower housing 634 which covers the lower half part of the motor 620, wherein the upper housing 632 and the lower housing 634 may be securely coupled to each other by multiple fastening bolts 636.

The motor shaft 622 may be formed long vertically inside the main body 500, wherein the cooling fan 610 described above may be coupled to the lower end of the motor shaft 622 and a power transmission end 640 connected to the blade assembly 200 may be connected to the upper end of the motor shaft 622. The power transmission end 640 may be configured to protrude to the outside of the upper part of the main body 500, and may transmit the rotational force of the motor 620 to the blade assembly 200.

Multiple PCB modules 560, 562, 564, and 566 may be provided inside the main body 500.

Specifically, the open lower surface of the inner casing 532 constituting the main body casing 530 may be covered by the base plate 540, and the multiple PCB modules 560, 562, 564, and 566 may be installed at the upper side of such a base plate 540.

The base plate 540 may be configured to have the shape of a rectangular plate having size corresponding to the size of the open lower surface of the inner casing 532, and the edge of such a base plate 540 is preferably coupled to the lower end of the inner casing 532.

The base plate 540 may be provided on the lower end of the main body 500 and may function to support the motor assembly 600 and multiple parts such as the PCB modules 560, 562, 564, and 566.

The base end 510 described above may be provided on the lower side of the base plate 540.

The PCB modules 560, 562, 564, and 566 may be disposed to be spaced apart from each other or be installed separately for each function inside the inner casing 532. That is, the PCB modules 560, 562, 564, and 566 may be disposed to be spaced apart from each other to surround the motor assembly 600 outside of the motor assembly 600, and may include a main PCB module 560 to control the overall operation of the blender, an inverter PCB module 562 to control the motor 620, a power PCB module 564 to control an input power, and a filtering PCB module 566 to remove noise.

In addition, according to the function of the blender of the present disclosure, these PCB modules 560, 562, 564, and 566 may be additionally provided, or a portion thereof may be omitted.

A heat dissipation member 544 for heat dissipation may be provided in the inverter PCB module 562. As illustrated in FIG. 9, the heat dissipation member 544 is preferably installed to be in contact with at least one of the multiple PCB modules 560, 562, 564, and 566, and may be configured such that multiple heat dissipation fins thereof dissipate heat in contact with air.

An air guide 550 may be provided on the upper surface of the base plate 540.

The air guide 550 may guide the discharge of air moved by the cooling fan 610, and the motor assembly 600 may be seated on the upper surface of such an air guide 550, and the cooling fan 610 may be located inside the air guide 550.

The cooling fan 610 may have blades having various shapes, and may be configured to inhale air of the inside of the motor assembly 600 located at the upper side of the cooling fan and to discharge the air laterally or downward.

Accordingly, when the cooling fan 610 rotates together with the motor shaft 622, air outside the main body 500 may be introduced into the main body 500, may flow downward through the inside of the motor housing 630, and then may flow due to the cooling fan 610 to be discharged through the air guide 550 to the outside.

A sealing member 552 may be provided between the air guide 550 and the motor assembly 600. That is, the motor assembly 600 may be seated on the upper surface of the air guide 550, and the sealing member 552 may be provided on the edge of the seating surface of the lower end of such a motor assembly 600.

The sealing member 552 is preferably made of an elastic material such as rubber, and may protect the motor assembly 600 from an impact generated while the motor assembly 600 sits on the air guide 550, and may cover a gap between the motor assembly 600 and the air guide 550 so as to block the movement of air or liquid.

Meanwhile, although not shown in detail, a discharge means may be provided on the main body 500 so as to guide liquid or foreign matter accumulated on the upper surface of the main body 500 such that the liquid or foreign matter is discharged to the outside.

The motor assembly 600 may be installed at the center portion of the main body 500, and may be composed of the motor shaft 622, the motor 620, and the motor housing 630.

In addition, as described above, the motor housing 630 may include the upper housing 632 which covers the upper half part of the motor 620, and the lower housing 634 which covers the lower half part of the motor 620, wherein the upper housing 632 and the lower housing 634 may be coupled to each other by the multiple fastening bolts 636.

The motor shaft 622 may be vertically installed through the center part of the motor 620, and the cooling fan 610 may be coupled to the lower end of such a motor shaft 622, and may be located inside the air guide 550 so as to force the flow of air. That is, due to the rotation of the cooling fan 610, air outside the main body 500 may be introduced into the main body 500 and then may flow along the air guide 550 to be discharged to the lower part of the main body 500.

Multiple housing holes 638 may be formed in the upper surface of the upper housing 632 by passing vertically therethrough. Accordingly, through the housing holes 638, air present above the motor assembly 600 may be introduced into the motor assembly 600.

The motor housing 630 is preferably configured such that sides thereof are covered. That is, the sides of each of the upper housing 632 and the lower housing 634 may be covered, and thus air introduced through the housing holes 638 into the motor assembly 600 may flow downward and may be discharged to the inside of the air guide 550.

Accordingly, the exterior of the motor assembly 600 may be constituted by the upper housing 632 and the lower housing 634, wherein the upper housing 632 may be configured to be covered in sides thereof, and the lower housing 634 may be configured to be sealed in all portions except for a necessary hole such as a work hole (not shown) through which a power line for supplying power passes.

This is intended to cover all sides of the motor housing 630, and air introduced through the housing holes 638 of the upper housing 632 into the motor assembly 600 may not be discharged to the side, but may flow to the lower part of the motor assembly 600 to be introduced into the air guide 550.

The main body 500 may be provided with the air guide 550 so as to guide the discharge of air passing through the motor assembly 600 to the lower part of the main body 500. That is, as described above, the air guide 550 may be in contact with the lower end of the motor assembly 600 and may guide air flowing to the internal lower side of the motor assembly 600 from an internal upper side thereof to the lower side of the main body 500. Specifically, the air guide 550 may be mounted to the base plate 540 provided on the lower end of the main body 500.

Meanwhile, as described above, the base end 510 having space in which the wireless power module 520 is received may be provided under the base plate 540.

An air discharge hole 512 may be formed vertically through a first end of the base end 510 so as to guide the discharge of air introduced into the main body 500 back to the outside. That is, as illustrated in the drawing, multiple air discharge holes 512 may be formed vertically through a portion adjacent to the left end of the bottom surface of the base end 510.

In addition, an air introduction hole 514, which is a passage through which air outside the main body 500 is introduced into the main body 500, may be formed vertically through the second end of the base end 510. That is, multiple air introduction holes 514 may be formed vertically through a portion adjacent to the right end of the bottom surface of the base end 510.

An air introduction guide hole 588, which guides air introduced into the main body 500, and an air discharge guide hole 586, which guides the discharge of air inside the main body 500 to the outside, may be formed vertically through the base plate 540.

The air introduction guide hole 588 of the base plate 540 and the air introduction hole 514 of the base end 510 may be installed at positions corresponding vertically to each other. That is, the air introduction guide hole 588 is preferably located above the air introduction hole 514. This is intended to allow air introduced into the main body 500 from the lower outside of the main body 500 through the air introduction hole 514 to directly pass through the air introduction guide hole 588.

The air discharge guide hole 586 of the base plate 540 and the air discharge hole 512 of the base end 510 may also be installed at positions corresponding vertically to each other. That is, the air discharge guide hole 586 is preferably installed to be located directly above the air discharge hole 512. This is intended to allow the internal air of the main body 500 passing through the air discharge guide hole 586 to be directly introduced into the air discharge hole 512.

The inverter PCB module 562 or the heat dissipation member 544 is preferably installed above the air introduction guide hole 588 of the base plate 540. That is, air outside the main body 500 may flow upward by sequentially passing through the air introduction hole 514 and the air introduction guide hole 588 from the lower side of the right end of the main body 500. Accordingly, the inverter PCB module 562 and the heat dissipation member 544 are preferably installed above the air introduction guide hole 588 such that the cold outside air is in contact with and heat exchanged with the inverter PCB module 562 and the heat dissipation member 544.

The heat dissipation member 544 may be fixedly installed in the main body 500 by the heat dissipation frame 546. That is, the heat dissipation frame 546 may be configured to cover the upper, lower, and side ends of the heat dissipation member 544, wherein the lower end of the heat dissipation member 544 may be in contact with the base plate 540 such that the heat dissipation member 544 is supported by the base plate 540.

A blocking wall having a predetermined height which blocks the lateral movement of air may be formed on the edge of the air introduction hole 514 or the air discharge hole 512 of the base end 510. Such a blocking wall is intended to block the lateral movement of air and to guide the vertical movement of air.

The sealing member 552 made of an elastic material may be provided between the motor assembly 600 and the air guide 550. The sealing member 552 may have a circular ring shape as a whole, and preferably has size and shape corresponding to the lower end of the motor assembly 600.

The sealing member 552 may function to seal a gap between the lower end of the motor assembly 600 and the air guide 550 such that the flow of air through the gap is prevented, and may function to protect the motor assembly 600 from an impact generated while the motor assembly 600 is installed on the air guide 550.

A discharge member 750 may be provided in the main body 500. The discharge member 750 is intended to discharge static electricity generated in the main body 500 to the outside, and is preferably provided inside the main body casing 530 and the seating step 900.

Specifically, the discharge member 750 may be made of metal and may function to connect the main body casing 530 constituting the exterior of the main body 500 with the lower step ring 912 and the upper step ring 914. When static electricity is famed in any one portion of metallic exterior casings, the one portion may be connected to a ground bracket (not shown to discharge the static electricity.

In the present disclosure, the discharge member 750 is provided to connect the main body casing 530 with each of the lower step ring 912 and the protruding piece 916.

Figure 10:
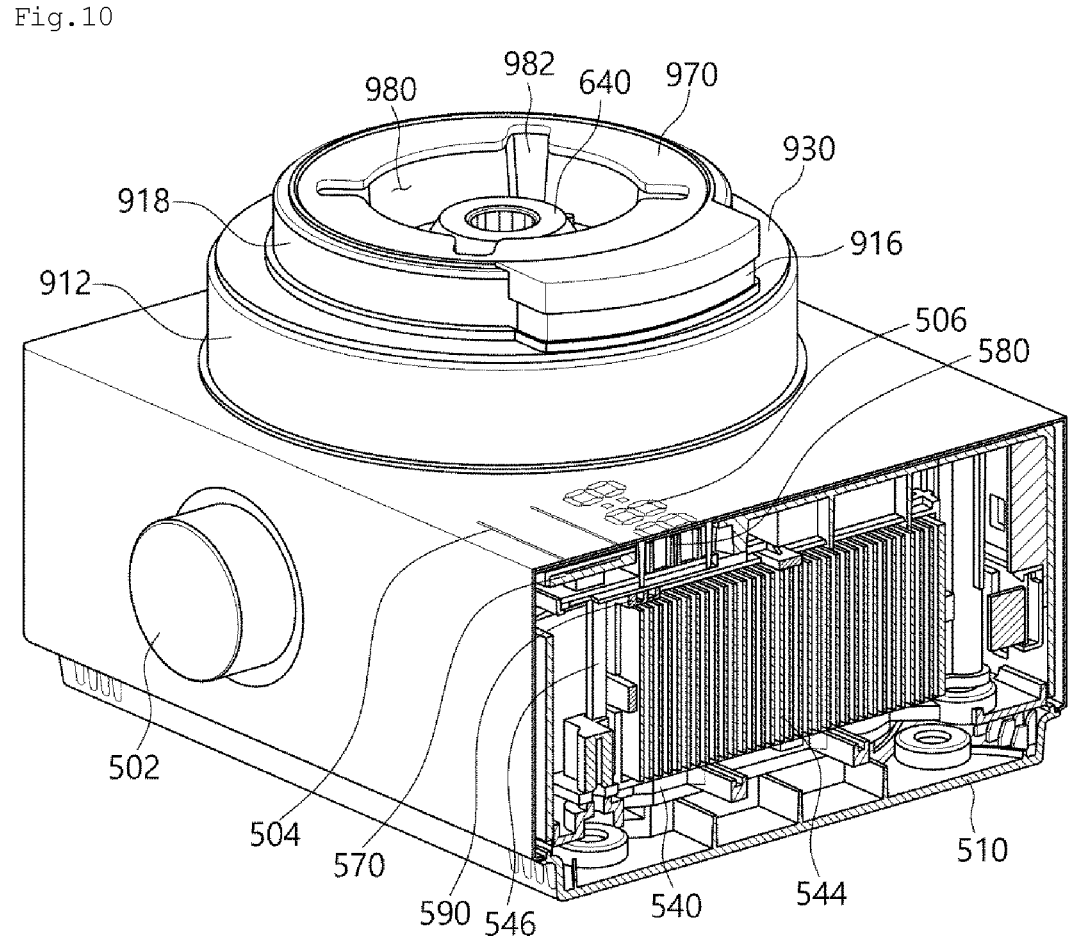
FIG. 10 is a cutaway perspective view illustrating a state in which the right side of the main body constituting the blender according to the embodiment of the present disclosure is partially cut.
Figure 11:
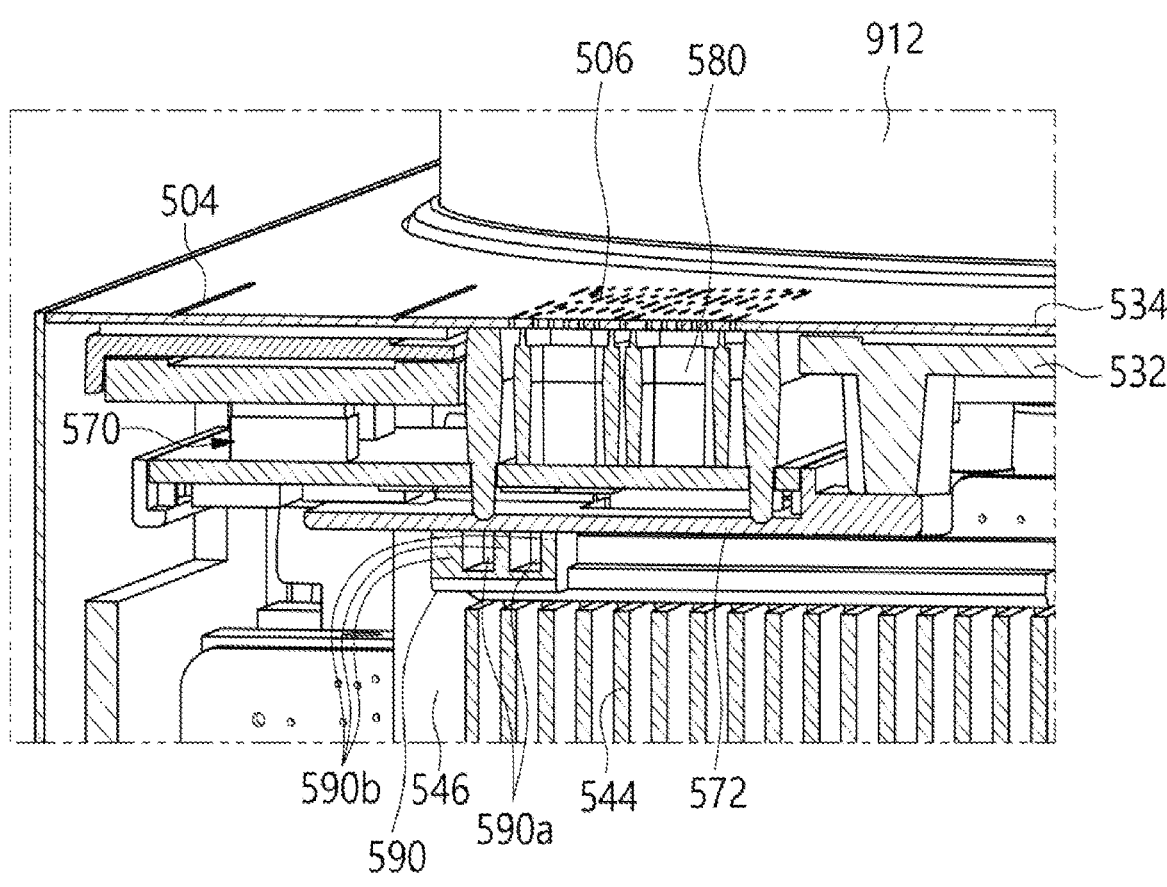
FIG. 11 is a cutaway perspective view illustrated by cutting a portion of the main body constituting the blender according to the embodiment of the present disclosure.
Figure 12:
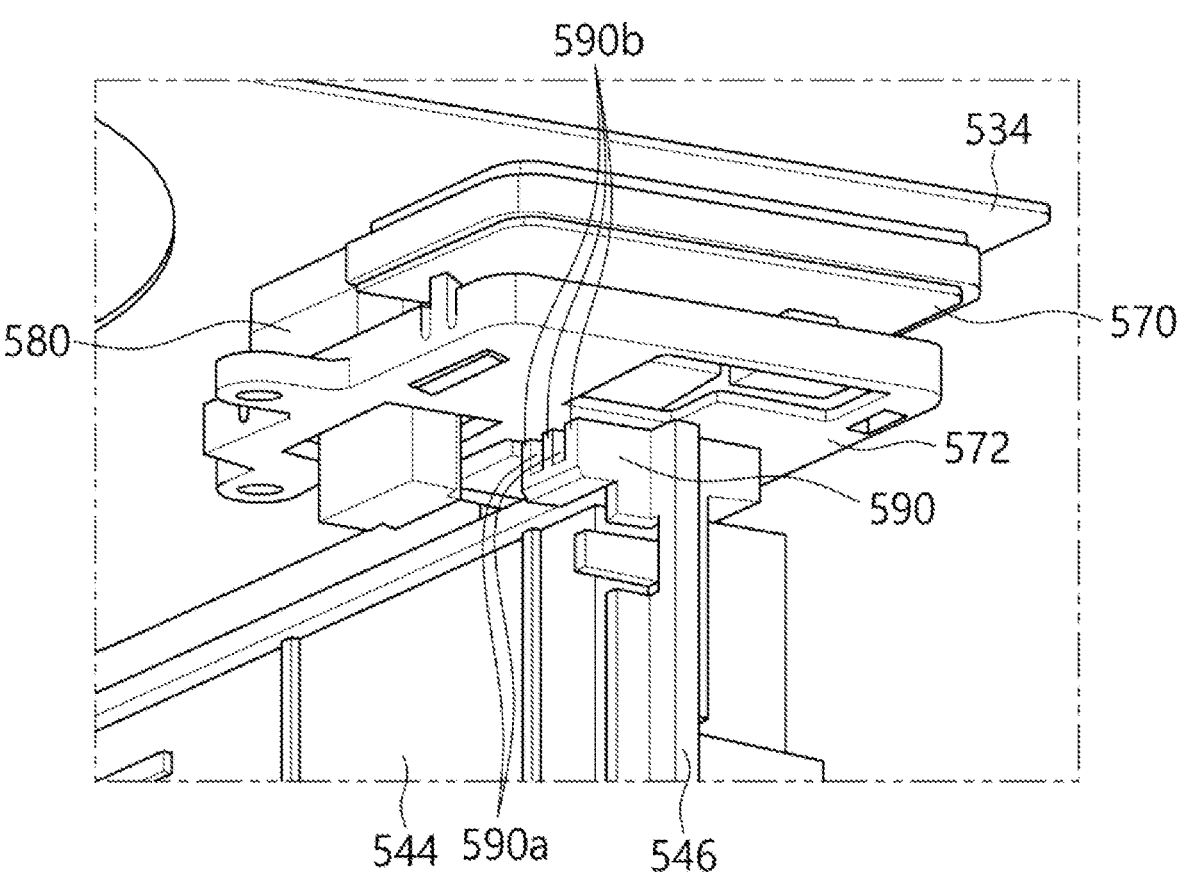
FIG. 12 is a partial perspective view illustrating the installed state of a touch module constituting the blender according to the embodiment of the present disclosure.
Figure 13:
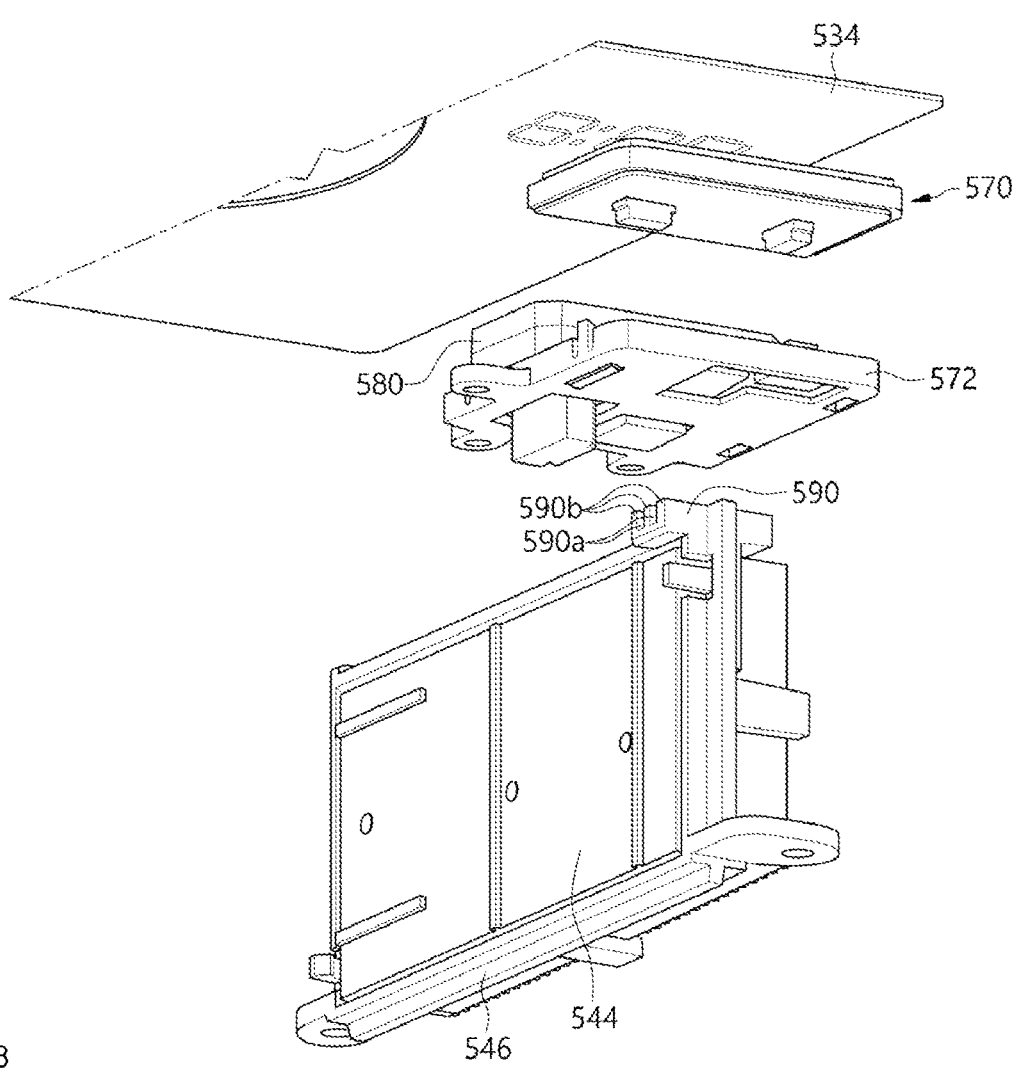
FIG. 13 is an exploded partial perspective view illustrating the installed state of the touch module constituting the blender according to the embodiment of the present disclosure.
Figure 14:
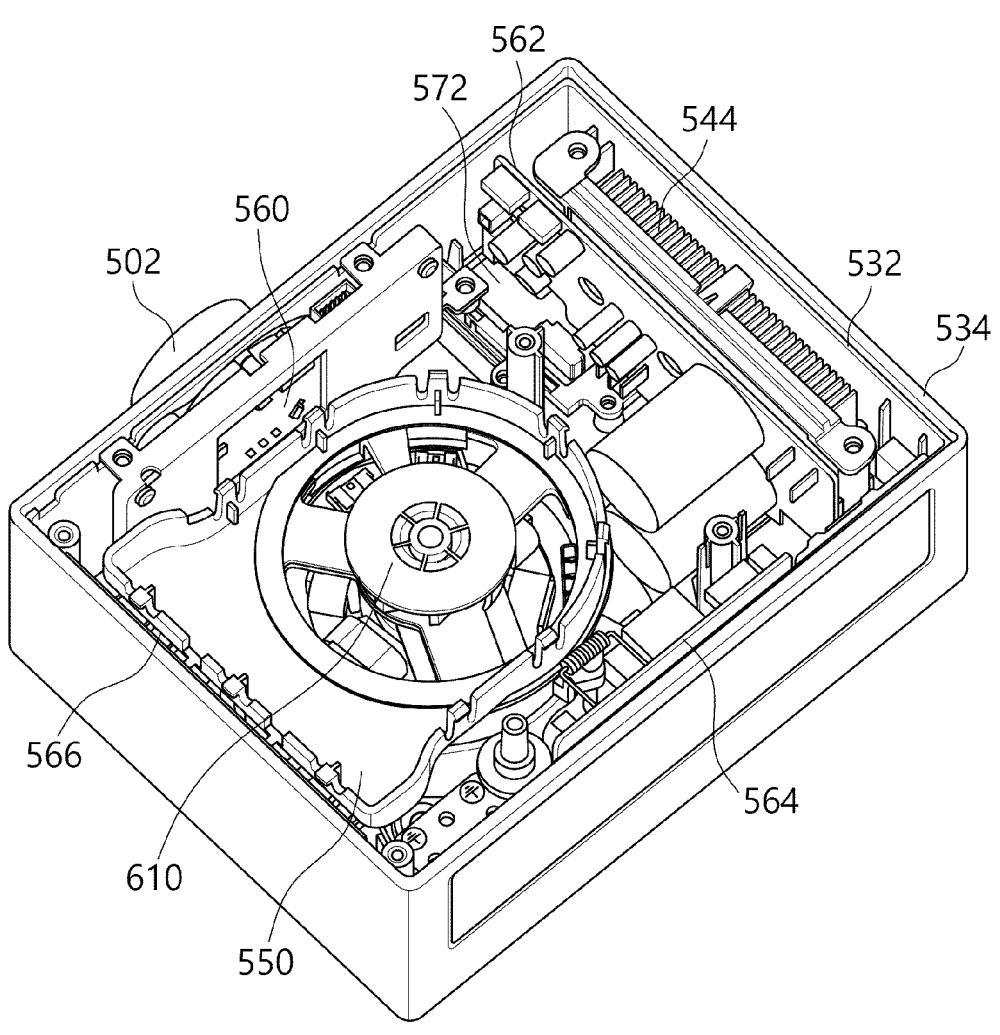
FIG. 14 is a bottom perspective view illustrating the internal configuration of the main body constituting the blender according to the embodiment of the present disclosure.
Figure 15:
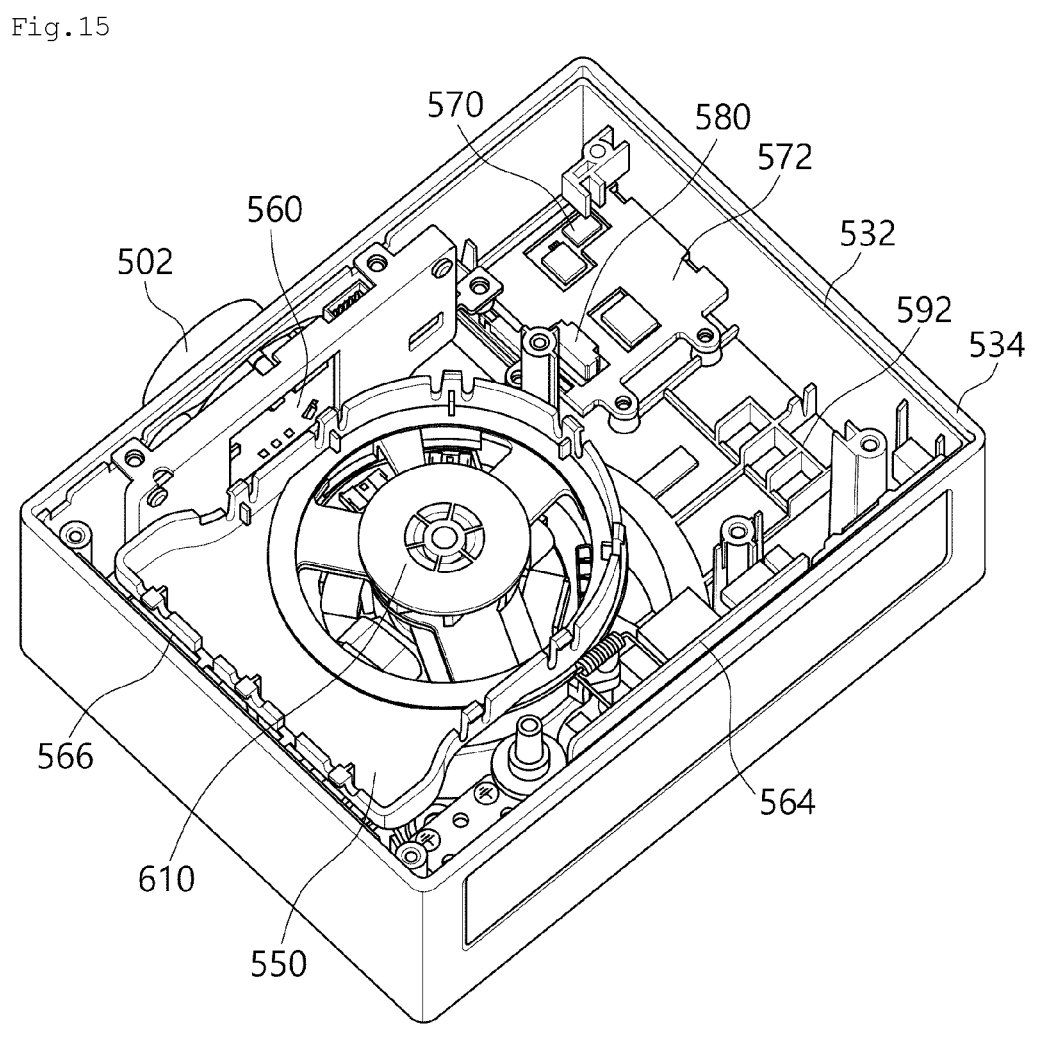

FIGS. 10 to 15 illustrate the internal configuration of the main body 500. That is, FIG. 10 illustrates a cutaway perspective view shown by cutting a portion of the right end of the main body 500, FIG. 11 illustrates a cutaway perspective view shown by cutting a portion of components under the touch manipulation part 504 and the display part 506 of the main body 500, and FIG. 12 and FIG. 13 respectively illustrate a partial perspective view and an exploded partial perspective view showing the installed state of the touch module 570 provided inside the main body 500. Additionally, FIG. 14 illustrates a bottom perspective view of the inside of the main body 500 showing the internal configuration of the main body 500 in a state in which the base plate 540 and the base end 510 covering the lower side of the main body casing 530 are removed therefrom, and FIG. 15 illustrates a bottom perspective view of the inside of the main body 500 showing a state in which the inverter PCB module 562 and the heat dissipation member 544 are removed from the main body of FIG. 14. That is, FIGS. 14 and 15 are perspective views of the inside of the main body 500 turned upside down.

As illustrated in these drawings, the main body 500 may be provided with the touch module 570 configured to detect a touch by a user, and the display module 580 configured to display the operation state of the blender, wherein these touch module 570 and display module 580 may be configured to be supported by the supporter 590.

The touch module 570 is preferably provided under the touch manipulation part 504 formed on the upper surface of the main body 500. That is, the touch manipulation part 504 may be provided on the upper surface of the main body 500 so as to manipulate the starting or stopping of the operation of the blender, or a time setting thereof, and the touch module 570 may be provided under such a touch manipulation part 504, the touch module 570 functioning to detect the press or touch of the touch manipulation part 504 by a user so as to transmit a signal.

The display module 580 may be provided under the display part 506 formed on the upper surface of the main body 500, and may be configured as at least one seven-segment display. Accordingly, through the display module 580, the display part 506 may display the temperature, operation time, or operation signal of the blender to the outside.

The supporter 590 may function to block the downward movement of the touch module 570. That is, the supporter 590 may be provided under the touch module 570 and may prevent the touch module 570 from sagging or moving downward when a user presses or touches the touch manipulation part 504. Accordingly, due to the prevention of the downward movement of the touch module 570, when a user presses or touches the touch manipulation part 504, the signal of the touch manipulation part 504 may be accurately transmitted to the touch module 570, and a user's touch feeling may be improved.

The touch module 570 may be held by the PCB holder 572, and the supporter 590 may be provided under the PCB holder 572. That is, as illustrated in FIG. 13, the PCB holder 572 having the shape of a flat plate having predetermined size and thickness may be provided under the touch module 570 and the display module 580 (above the touch module 570 and the display module 580 in FIG. 14 and FIG. 15), and the touch module 570 and the display module 580 may be placed to be supported on the upper surface of such a PCB holder 572 (on a lower surface thereof in FIGS. 14 and 15).

The PCB holder 572 may be coupled to the inner casing 532. That is, the PCB holder 572 may be configured to be mounted to the lower part of the upper surface of the inner casing 532 by at least one screw (an upper part thereof in FIGS. 14 and 15).

The supporter 590 may be provided on an end of the heat dissipation frame 546 which fixedly supports the heat dissipation member 544 provided inside the main body 500. More specifically, as described above, the heat dissipation frame 546 may be installed to cover the upper and lower ends of the heat dissipation member 544 and may fixedly support the heat dissipation member 544, and the supporter 590 may be provided on the upper end of the front end part of such a heat dissipation frame 546.

As illustrated in FIG. 12, the supporter 590 may be famed by protruding sideward or upward from the upper end of the heat dissipation frame 546, and such a supporter 590 may be installed to have an upper end in close contact with the lower surface of the PCB holder 572.

As illustrated in FIG. 12, at least one groove 590a may be formed in the supporter 590. That is, at least one groove 590a which is depressed may be formed on the upper surface of the supporter 590, or at least one groove 590a recessed inward from a side surface of the supporter 590 may be formed on the upper surface of the supporter 590. Accordingly, when the groove 590a is formed in the supporter 590, the supporter 590 may be decreased in weight and material cost while supporting the PCB holder 572.

In addition, the supporter 590 may include at least one rib 590b. That is, as illustrated in FIG. 11, the supporter 590 may be provided with at least one rib 590b protruding upward, and such a rib 590b may be configured to have an upper end in contact with the PCB holder 572.

Furthermore, a support member 592 may be provided under the upper surface of the main body casing 530 such that the sagging of the main body casing 530 is prevented even when the upper surface of the main body casing 530 is pressed by a user.

Hereinafter, the operation of the blender of the present disclosure having the above configuration will be described with reference to the accompanying drawings.

When the container body 100 is seated on the main body 500, the blender is in a state of FIG. 1, and in this state, the use of the blender of the present disclosure starts.

First, in order for a user to use the blender, power supply from the outside may be required, and this power supply may be wirelessly performed by the wireless power module 520. That is, power supply from the outside may be performed in a method of using an induced electromotive force, and of course, power supply may be performed by wire.

The power of the wireless power module 520 may be supplied to parts which require power, such as the motor assembly 600, the touch manipulation part 504, and the power transmission means 700, and a user may manipulate the starting or stopping of the blender by manipulating the touch manipulation part 504 or the knob 502.

For example, when a user is intended to start crushing food by manipulating the touch manipulation part 504 or the knob 502, the motor assembly 600 may be required to be operated to rotate the blades of the blade assembly 200.

However, in this case, the detection system may determine whether the container lid 400 is closed, and when the container lid 400 is opened, the motor assembly 600 and the blade assembly 200 may not operate.

Specifically, since the reed switch 234 is normally turned off, the power reception means 220, the reed switch 234, and the light transmission module 810 may not form a closed circuit in the container body 100, and thus the light reception means 820 may not receive light.

Accordingly, when the light reception means 820 does not receive light, due to such a signal, the supply of power to the motor assembly 600 may be blocked.

In this state, when the container lid 400 is closed, the permanent magnet 232 of the container lid 400 may approach the reed switch 234, and thus the reed switch 234 may be turned on. Accordingly, the power reception means 220, the reed switch 234, and the light transmission module 810 may formed a closed circuit, so the light reception means 820 may receive light generated by the light transmission module 810.

In this case, the closing of the container lid 400 may be detected, and according to the manipulation of a user, the operation of the motor assembly 600 may start and food inside the container body 100 may be crushed. Of course, in this case, the mounting of the container body 100 to the main body 500 may be detected by the container body detection switch 960, and the operation of the motor assembly 600 may start.

In addition, in this case, the operation state of the blender of the present disclosure may be displayed through the display part 506 to the outside, and thus a user may visually recognize the operation state or time of the blender.

Meanwhile, when a user opens or closes the container lid 400 of the container body 100, the user may open or close the container lid 400 by gripping the upper half part of the cap 450 with the hand. The container lid 400 may be in close contact with and held on the upper surface of the container body 100 by a user pushing the container lid 400 downward from a side above the container lid 400. In this case, a gap between the container lid 400 and the container body 100 may be covered by the gasket 402 provided on the outer surface of the container lid 400.

Furthermore, the cap 450 mounted to the center portion of the container lid 400 may be removed therefrom by a user, and this is possible when a user grips the upper end of the cap 450 and rotates the cap 450 as described above.

When the cap 450 is removed from the container lid 400, a user may insert food into the container body 100 through the lid hole 401, and may control food inside the container body 100 with a rod passing through the lid hole 401.

Due to the operations of the motor assembly 600 and the blade assembly 200, food contained inside the container body 100 may be crushed or mixed and the work intended by a user may be completed. In this case, a user may move the container body 100 upward from the main body 500 to be removed therefrom, and then may open the container lid 400 to take out food contained inside the container body 100.

In addition, according to the operation of the motor assembly 600, the cooling fan 610 connected to the lower end of the motor shaft 622 may rotate.

When the cooling fan 610 rotates, external air may be introduced into the main body 500 and then may be discharged back to a side under the main body 500.

Specifically, according to the rotation of the cooling fan 610, external air of the side under the main body 500 may be introduced upward along the air introduction hole 514 formed in a position adjacent to the right end of the base end 510.

The external air introduced along the air introduction hole 514 may flow upward along the air introduction guide hole 588 of the base plate 540 and may pass through and exchange heat with the inverter PCB module 562 and the heat dissipation member 544 provided above the base plate 540. That is, the inverter PCB module 562 and the heat dissipation member 544 may exchange heat with external air to be cooled.

Next, the external air may be collected in the center of the inner upper side of the main body 500, and may be introduced through the housing holes 638 formed in the upper surface of the motor housing 630 into the motor assembly 600.

The air introduced into the motor assembly 600 may exchange heat with the coil of the inside of the motor 620 so as to cool the motor 620, and continuously may be discharged to the lower side of the motor assembly 600 and may be introduced into the air guide 550.

Air discharged laterally from the inside of the air guide 550 by the cooling fan 610 may flow to the left of the air guide 550, and may pass through the air discharge guide hole 586 formed in a position adjacent to the left end of the base plate 540 to flow downward, and continuously, may pass through the air discharge hole 512 formed in a position adjacent to the left end of the base end 510 to be discharged to a side under the main body 500.

Through such a process, air introduced into the main body 500 may be discharged back to the outside of the main body 500, and in this process, electronic parts provided inside the main body 500 may be cooled.

The scope of the present disclosure is not limited to the embodiment illustrated above, and many other modified embodiments based on the present disclosure will be possible for those skilled in the art within the above technical scope.

For example, in the above embodiment, the supporter 590 supporting the touch module 570 is installed on the heat dissipation frame 546, but such a supporter 590 may be installed in another portion.

What is claimed is:

1. A blender comprising:

a container body in which food is received;

a main body configured to support the container body;

a container lid detachably mountable to an upper surface of the container body; and a touch module disposed at the main body, wherein the main body includes a cooling fan configured to introduce external air into the main body and discharge air to a side under the main body, a heat dissipation member disposed above an air introduction guide hole of a base plate so as to exchange heat with the introduced external air, and a heat dissipation frame which fixedly supports the heat dissipation member by covering upper, lower and side ends thereof, wherein the touch module is held by a printed circuit board (PCB) holder coupled to an inner casing of the main body, and a supporter is provided at an upper end of a front end part of the heat dissipation frame in close contact with a lower surface of the PCB holder to block a downward movement of the touch module.

2. The blender of claim 1, comprising a touch manipulation part disposed at an upper surface of the main body, wherein the touch module is disposed under the touch manipulation part.

3. The blender of claim 1, wherein the supporter comprises at least one rib.

4. The blender of claim 1, wherein the support member supports an upper surface of the inner casing.

5. The blender of claim 1, wherein the touch module is supported by the supporter.

6. The blender of claim 5, wherein the touch module is disposed under a touch manipulation part disposed at the upper surface of the main body casing.

7. The blender of claim 1, wherein the supporter fixedly supports the heat dissipation member disposed at the inner casing of the main body.

8. The blender of claim 1, wherein the main body casing includes an opening at a lower side of the main body casing; and the base plate disposed at the lower side of the main body casing.

9. The blender of claim 8, further comprising a base end disposed at the lower side of the main body casing, and the base plate is in contact with the base end.

10. The blender of claim 1, wherein the supporter comprises at least one groove.

* * * * *